US009835463B2

(12) United States Patent
Takahashi

(10) Patent No.: US 9,835,463 B2
(45) Date of Patent: Dec. 5, 2017

(54) ROUTE SEARCHING DEVICE, TERMINAL DEVICE, AND ROUTE SEARCHING METHOD

(71) Applicants: Pioneer Corporation, Kanagawa (JP); Pioneer System Technology Corporation, Miyagi (JP)

(72) Inventor: Yuji Takahashi, Saitama (JP)

(73) Assignees: PIONEER CORPORATION, Kanagawa (JP); PIONEER SYSTEM TECHNOLOGY CORPORATION, Miyagi (JP)

( * ) Notice: Subject to any disclaimer, the term of this patent is extended or adjusted under 35 U.S.C. 154(b) by 0 days.

(21) Appl. No.: 14/898,662

(22) PCT Filed: Jun. 28, 2013

(86) PCT No.: PCT/JP2013/067775
§ 371 (c)(1),
(2) Date: Dec. 15, 2015

(87) PCT Pub. No.: WO2014/207884
PCT Pub. Date: Dec. 31, 2014

(65) Prior Publication Data
US 2016/0138925 A1 May 19, 2016

(51) Int. Cl.
*G01C 21/34* (2006.01)
*B60L 11/18* (2006.01)
*G01C 21/36* (2006.01)

(52) U.S. Cl.
CPC ........... *G01C 21/34* (2013.01); *B60L 11/18* (2013.01); *B60L 11/1809* (2013.01); *B60L 11/1848* (2013.01); *G01C 21/3697* (2013.01)

(58) Field of Classification Search
None
See application file for complete search history.

(56) References Cited

U.S. PATENT DOCUMENTS

2011/0224900 A1    9/2011  Hiruta et al.
2011/0288765 A1 * 11/2011  Conway ............ G01C 21/3469
                                              701/533
(Continued)

FOREIGN PATENT DOCUMENTS

JP    2006-112932    4/2006
JP    2010115032 A   5/2010
(Continued)

OTHER PUBLICATIONS

International Search Report, PCT/JP2013/067775, dated Sep. 17, 2013.
(Continued)

Primary Examiner — Thomas G Black
Assistant Examiner — Ce Li
(74) Attorney, Agent, or Firm — Young & Thompson

(57) ABSTRACT

When a route searching command is input, a control unit searches for a provisional route disregarding remaining energy. Next, a finding unit finds charging lanes and charging spots near the provisional route and a calculation unit calculates a charging lane traveling distance and a spot charging usage amount. Then, a searching unit searches for charging lane information, and the like, the first route that restrains charging up cost and uses charging lanes and searches for, on the basis of the spot charging usage amount, charging spot information, and the like, the second route that restrains charging up cost and uses charging spots. A generation unit generates information about the retrieved routes that includes charging up cost and the expected time required. which is presented by a presentation unit. Accordingly, it is possible to find routes including charging plans that use charging lanes and charging spots and to enhance user convenience.

8 Claims, 16 Drawing Sheets

(56) References Cited

U.S. PATENT DOCUMENTS

| | | | | |
|---|---|---|---|---|
| 2012/0109515 A1* | 5/2012 | Uyeki | ................ | G01C 21/3469 |
| | | | | 701/423 |
| 2012/0109519 A1* | 5/2012 | Uyeki | ........................ | B60L 7/14 |
| | | | | 701/439 |
| 2012/0136574 A1* | 5/2012 | Kobayashi | ................ | B60L 3/12 |
| | | | | 701/533 |
| 2013/0342310 A1* | 12/2013 | Park | ........................ | B60L 3/12 |
| | | | | 340/5.7 |
| 2014/0163877 A1* | 6/2014 | Kiyama | ............. | G01C 21/3469 |
| | | | | 701/533 |
| 2015/0142305 A1* | 5/2015 | Kubo | ................ | G01C 21/3469 |
| | | | | 701/439 |

FOREIGN PATENT DOCUMENTS

| | | |
|---|---|---|
| JP | 2011-185785 | 9/2011 |
| JP | 2012-047670 | 3/2012 |
| JP | 201273272 A | 4/2012 |
| JP | 2012163511 A | 8/2012 |
| JP | 2013200247 A | 10/2013 |
| JP | 2013228238 A | 11/2013 |

OTHER PUBLICATIONS

Japanese Office Action dated Aug. 24, 2016; Appln. No. 2015-523769.

Japanese Office Action dated Nov. 22, 2016; Application No. 2015-523769.

* cited by examiner

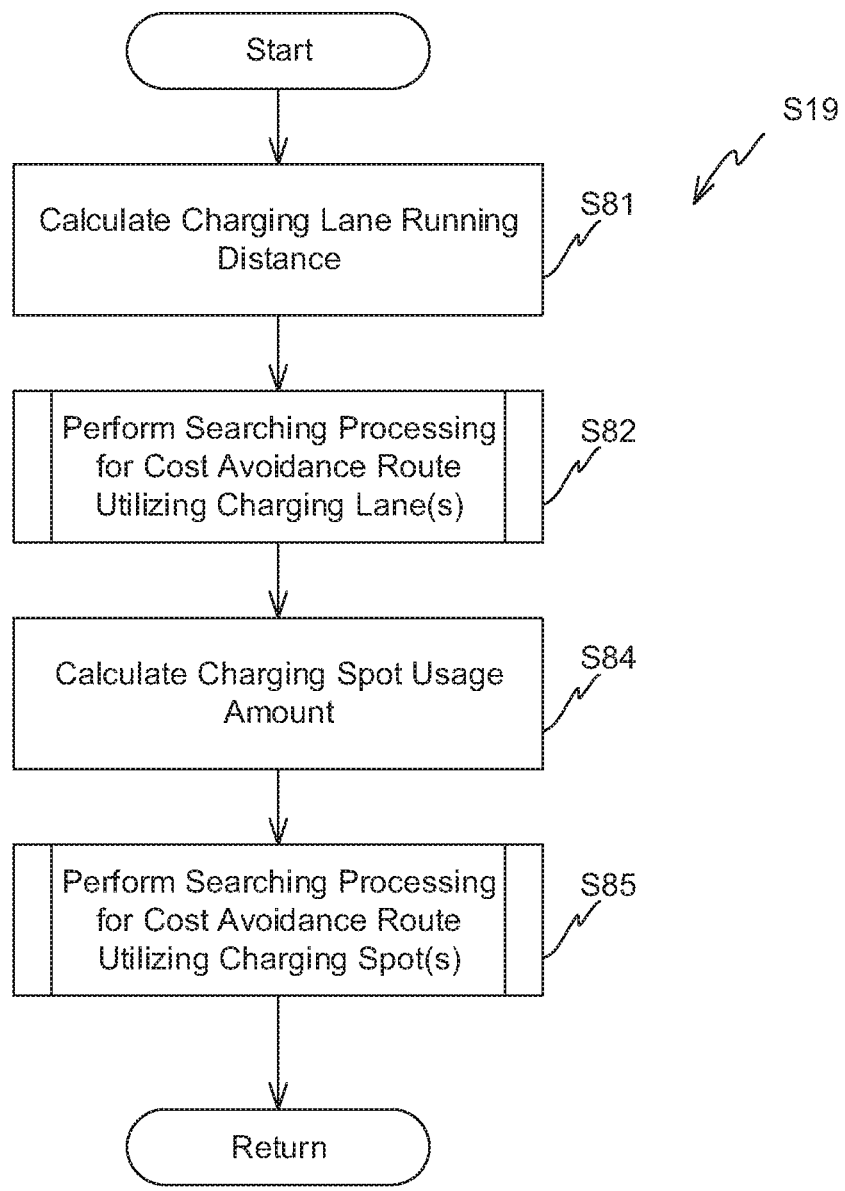

Fig. 11

| Route Search Results | Kuki-shi → Sendai-shi | | | | | |
|---|---|---|---|---|---|---|
| | | Distance | Expected Traveling Time Required | Toll Road Charge | Charging up Cost | Remaining Battery Amount |
| Route 1 | Priority to Charging Lanes | Recommendation 1 | 345.0 km | 240 minutes | 6,000 yen | 1,800 yen | 15 % |
| Route 2 | Priority to Charging Lanes | Cost Avoiding | 380.0 km | 450 minutes | 0 yen | 1,500 yen | 30 % |
| Route 3 | Priority to Charging Lanes | Priority to Charging | 345.0 km | 250 minutes | 6,000 yen | 3,200 yen | 78 % |
| Route 4 | Priority to Charging Spots | Recommendation 2 | 350.0 km | 320 minutes | 6,000 yen | 1,000 yen | 15 % |
| Route 5 | Priority to Charging Spots | Cost Avoiding | 380.0 km | 490 minutes | 0 yen | 500 yen | 25 % |
| Route 6 | Priority to Charging Spots | Priority to Charging | 360.0 km | 340 minutes | 6,000 yen | 1,500 yen | 79 % |

Fig. 12
(A)
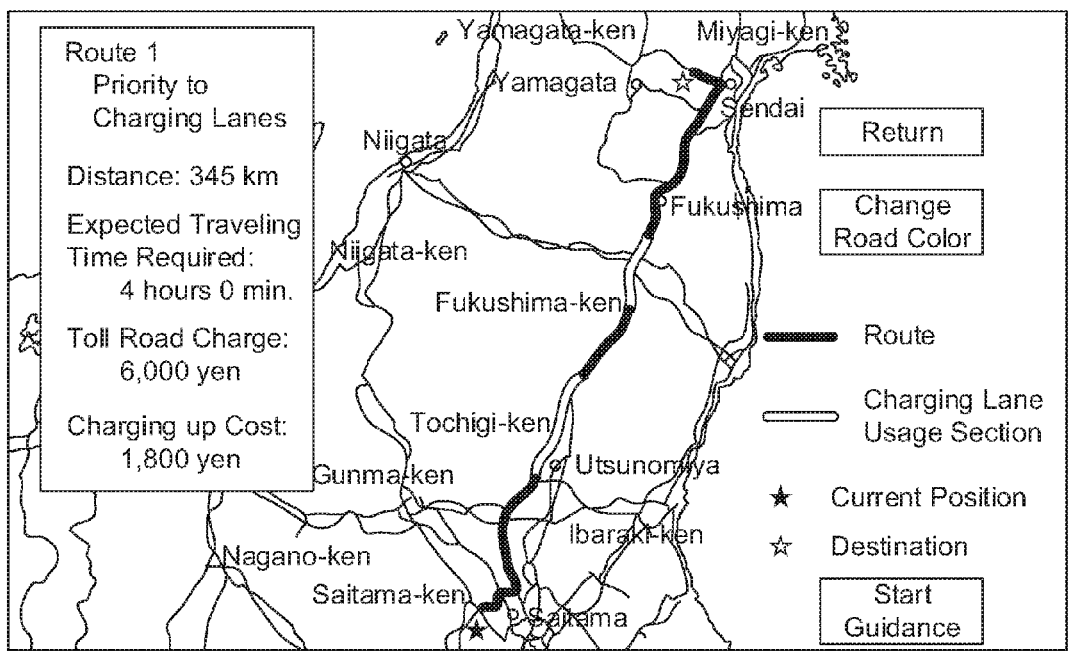
(B)
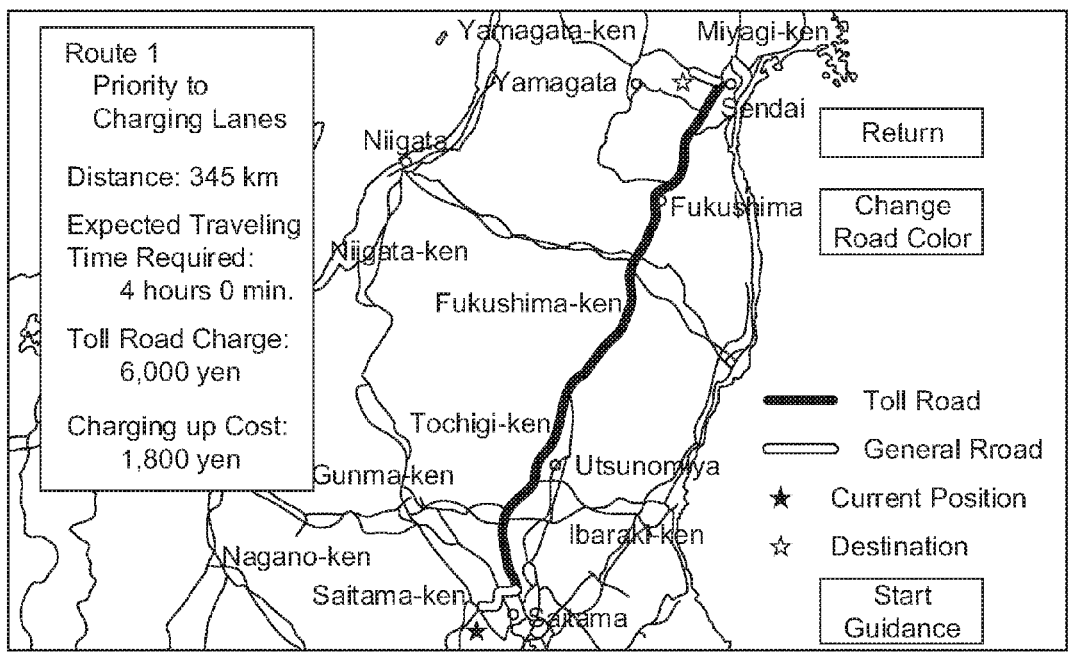

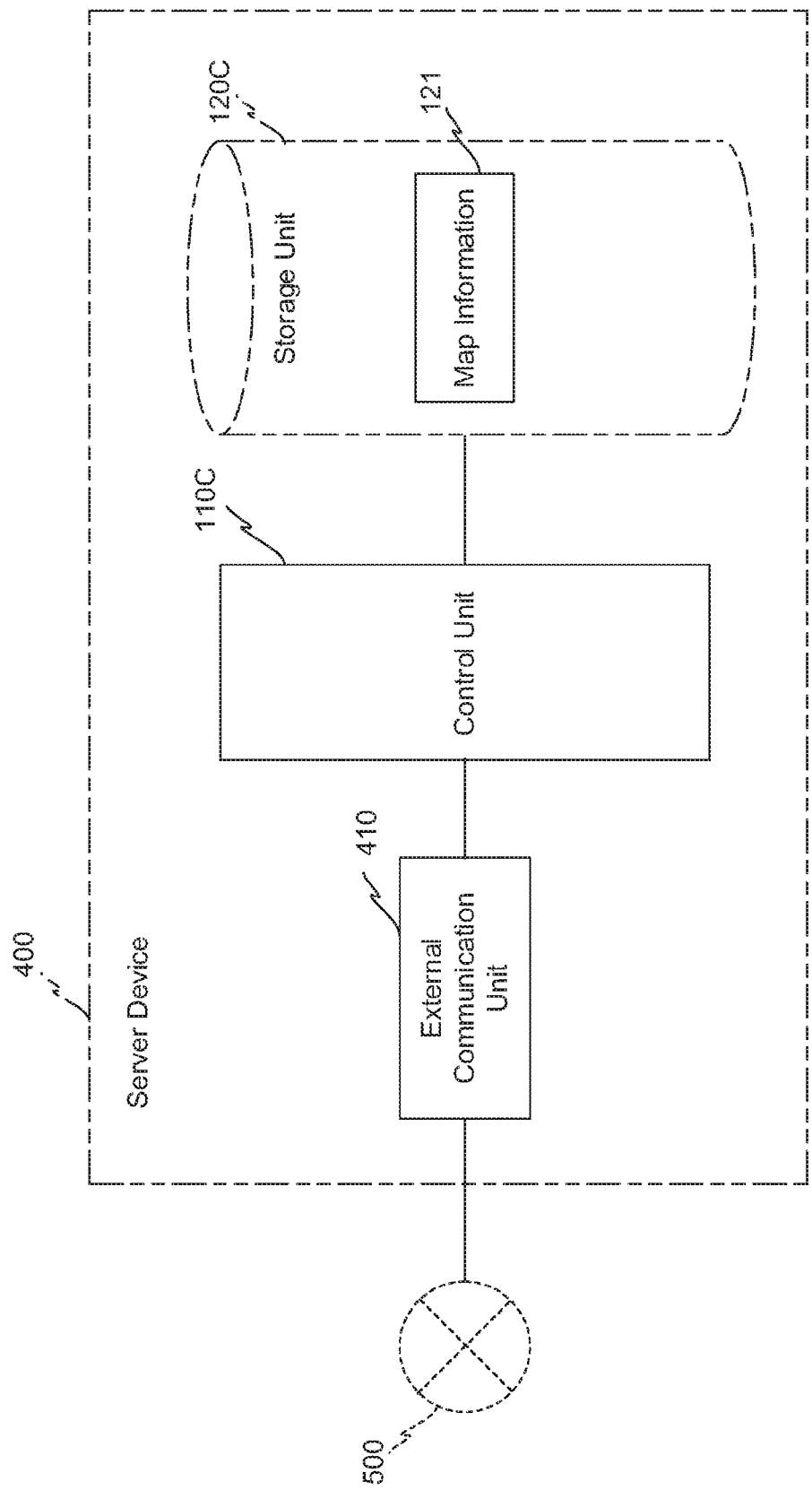

ROUTE SEARCHING DEVICE, TERMINAL DEVICE, AND ROUTE SEARCHING METHOD

TECHNICAL FIELD

The present invention relates to a route searching device, to a terminal device, to a route searching method, to a route searching program, and to a recording medium upon which such a route searching program is recorded.

BACKGROUND ART

In recent years, electrically powered vehicles have become widespread that employ batteries as sources of drive force, such as electric automobiles that employ batteries for providing their drive force and hybrid vehicles that employ batteries for providing part of their drive force. Along with electrically powered vehicles (hereinafter simply referred to as "vehicles") of this type becoming more widespread, "charging spots" have appeared at various locations, at which, when it is desired to charge a battery that is provided to an electrically powered vehicle, it is possible to perform charging of the battery of the vehicle in the state in which the vehicle is stopped.

Furthermore, as another method of charging a battery that is fitted to an electrically operated vehicle, plans are underway for implementing "charging lanes" in which the batteries provided to electrically powered vehicles can be charged up while the vehicles are traveling. In response to plans for implementing such "charging lanes", a technique for performing route guidance to a destination while considering the possibilities for charging up the vehicle battery using "charging lanes" and "charging spots" has been proposed (refer to Patent Document #1, hereinafter termed the "prior art").

PRIOR ART DOCUMENT

Patent Documents

Patent Document #1: Japanese Laid-Open Patent Publication 2012-47670.

SUMMARY OF THE INVENTION

Problem to be Solved by the Invention

With the technique of the prior art, if it has been decided that it is necessary to charge the battery of the vehicle in order for the vehicle to travel to the destination, then, even if one or more "charging spots" are present along the route, it is arranged preferentially to guide the driver to a route that goes via a "charging lane". This is because there are the advantageous aspects from the point of view of the user of giving priority in this manner to the use of "charging lanes" for charging the battery that, by using "charging lanes", (i) the user does not need to perform the task of connecting a connector of a charging device to a connector of the vehicle at a "charging spot"; and (ii) if charging of the battery is performed by using a "charging lane" while traveling towards the destination, then the time taken until arrival at the destination will be shortened.

However, when a "charging lane" has been implemented in practice, from the standpoint of recovering the investment in the "charging lane" facility, (iii) it is considered that the charging up cost for charging up a battery of a vehicle by employing that "charging lane" should be relatively expensive, as compared to the employment of a "charging spot". And it is considered that the cost levied due to charging up by employing a "charging lane" should be determined according to the time period of traveling within that charging lane or according to the running distance in that charging lane, because this time interval and this running distance are correlated with the amount of charge that is actually received. Accordingly, from the standpoint of minimization of the cost of charging, charging by employing a "charging lane", in other words by traveling in a "charging lane", ought to be kept to the minimum possible limit.

Thus, while the employment of a "charging lane" has the beneficial aspects (i) and (ii) described above, it also has the negative aspect (iii) described above. On the other hand, as compared to the employment of a "charging lane", the employment of a "charging spot" has the beneficial aspect that the cost of charging becomes relatively cheap.

However, no mention is made in the prior art described above of any consideration related to the above negative point in connection with employment of a "charging lane", or of the above beneficial point in connection with employment of a "charging spot". Moreover, with the technique of the prior art described above, while route guidance is provided while giving priority to charging lanes, because no facility is available for route guidance while giving priority to charging spots which provides the beneficial aspect described above. Accordingly it has been difficult to say that route guidance is being provided according to the various possible requirements of the user.

Due to this, a technique is desired for presenting to a user route information including a charging plan that gives priority to charging by employing "charging lanes" and also other route information including another charging plan that gives priority to charging by employing "charging spots", and that thus can fully support route selection by the user. Fulfilling this requirement is one of the problems which the present invention is desired to solve.

The present invention has been conceived in consideration of the circumstances described above, and its object is to provide a novel route searching device, terminal device and route searching method that are capable of performing route searching including planning for charging by utilizing charging lanes and/or charging spots, thus enhancing the convenience from the point of view of the user.

Means for Solving the Problems

When viewed from a first standpoint, the present invention is a route searching device that searches for a route to a destination, comprising: a searching unit searching for a first route that gives priority to charging in a charging lane that performs charging of a battery of a moving body as said moving body travels, and a second route that gives priority to charging at a charging spot at which charging of said battery is performed in the state in which said moving body is stopped; and a generation unit generating information for presentation related to said first route and to said second route.

When viewed from a second standpoint, the present invention is a terminal device that is provided to a moving body having a battery, comprising: a reception unit receiving information for presentation related to a first route that has been found that gives priority to charging in a charging lane that performs charging of said battery as said moving body travels, and information for presentation related to a second route that has been found that gives priority to charging at a charging spot at which charging of said battery is performed in the state in which said moving body is stopped; and a presentation unit presenting said information for presentation received by said reception unit.

When viewed from a third standpoint, the present invention is a route searching method that is employed by a route searching device that searches for a route to a destination, comprising the steps of: a searching process of searching for a first route that gives priority to charging in a charging lane that performs charging of a battery of a moving body as said moving body travels, and a second route that gives priority to charging at a charging spot at which charging of said battery is performed in the state in which said moving body is stopped; and a generating process of generating information for presentation related to said first route and to said second route.

And, when viewed from a fourth standpoint, the present invention is a non-transient computer readable medium having recorded thereon a route searching program that, when executed, causes a computer in a route searching device that searches for a route to a destination to execute the route searching method according to the present invention.

BRIEF DESCRIPTION OF DRAWINGS

FIG. 10 is a flow chart for explanation of searching processing in FIG. 4 for a cost avoidance route;

FIG. 11 is an example of a list of information for presentation in relation to the first routes and to the second routes, displayed upon a display unit;

FIG. 12 shows two examples of display, upon the display unit, of information for presentation in relation to the first route;

FIG. 16 is a block diagram schematically showing the configuration of the server device of FIG. 14.

REFERENCE SIGNS LIST

Figure 1:
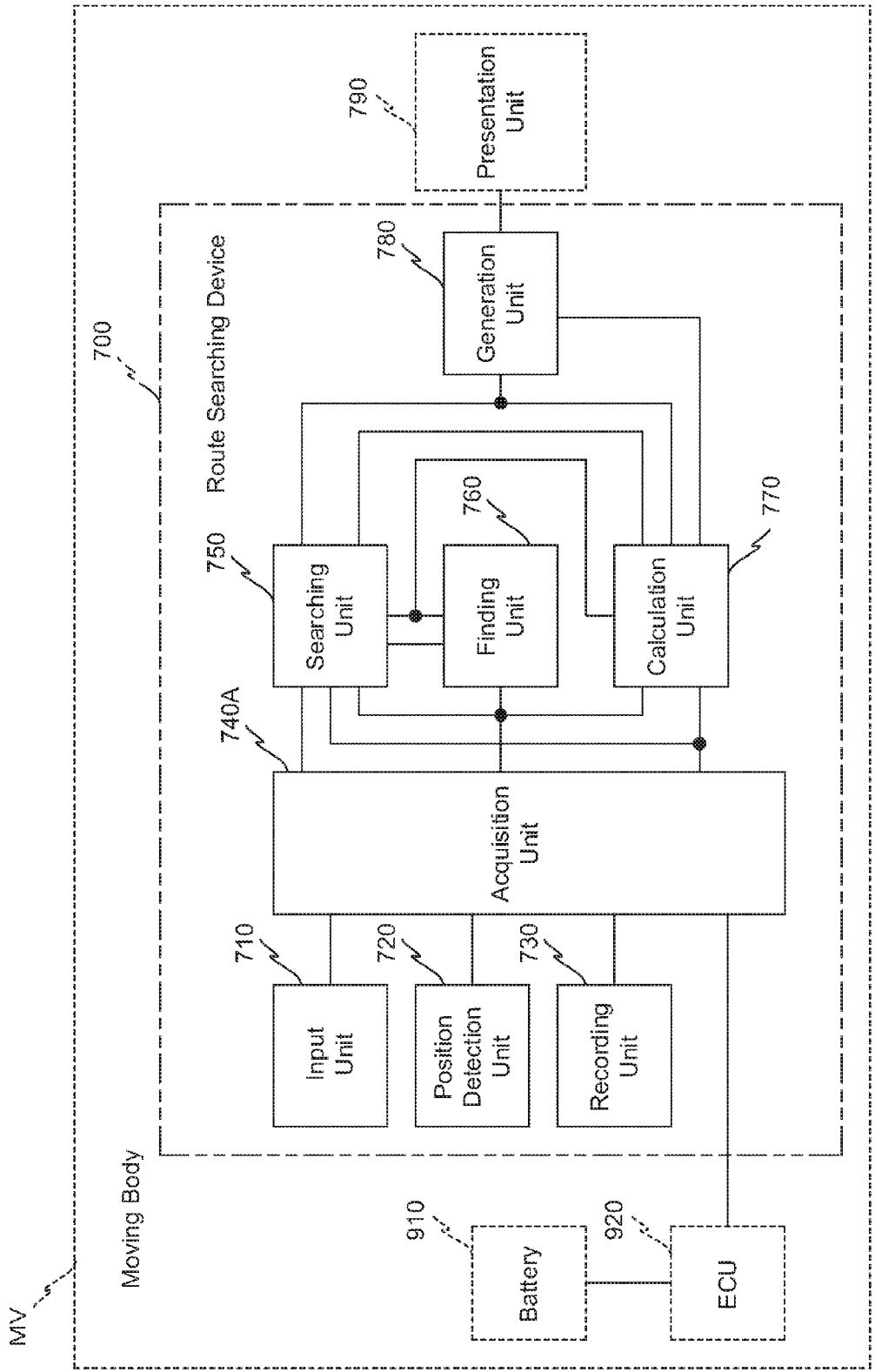
FIG. 1 is a block diagram showing the configuration of a route searching device according to the first embodiment of the present invention.

100: route searching device
110A: control unit (searching unit, finding unit, calculation unit, and generation unit)
110C: control unit (searching unit, finding unit, calculation unit, and generation unit)
130: audio output unit (presentation unit)
140: display unit (presentation unit)
300: terminal device
320: wireless communication unit (reception unit)
400: server device (route searching device)
700: route searching device
750: searching unit
760: finding unit
770: calculation unit (the first calculation unit and the second calculation unit)
780: generation unit
790: presentation unit
810: terminal device
811: transmission unit
812: reception unit
820: route searching device Embodiments for Carrying out the Invention In the following, embodiments of the present invention will be explained with reference to the appended drawings. Note that, in the following explanation and drawings, the same reference symbols will be appended to elements that are the same or equivalent, and duplicated explanation will be omitted.

[The First Embodiment]

First, the first embodiment of the present invention will be explained with reference to FIG. 1.

<Configuration>

A block diagram showing the configuration of a route searching device 700 according to the first embodiment of the present invention is shown in FIG. 1. The route searching device 700 is disposed within a moving body MV (for example, an electric automobile) that utilizes electrical energy for all its propulsion energy.

In the first embodiment, a battery 910 and an ECU (Electrical Control Unit) 920 are provided to the moving body MV, in addition to the route searching device 700. Moreover, a presentation unit 790 is mounted to the moving body MV.

Energy for propelling the moving body MV is accumulated in the battery 910 mentioned above. The moving body MV moves by employing this energy for propulsion.

The ECU 920 mentioned above collects the results of detection by sensors of various types that detect the state of the moving body MV. And, on the basis of these detection results that have thus been collected, the ECU 920 sequentially derives the values of parameters of various kinds that are useful for controlling the traveling of the moving body MV, and performs control and management of the traveling of the moving body MV.

In the first embodiment, the current value of the remaining amount of energy in the battery 910 (i.e. the remaining electrical power amount) is included in these parameter values that are derived by the ECU 920. And the ECU 920 sends this current value of the remaining energy amount in the battery 910 to the route searching device 700 via an in-vehicle communication network that operates according to a communication protocol such as, for example, a CAN (Controller Area Network) or the like.

The presentation unit 790 mentioned above comprises a display unit, an audio output unit, and so on. This presentation unit 790 receives data for presentation sent from the route searching device 700. And, on the basis of this data for presentation, the presentation unit 790 performs display output, audio output, and the like.

<<Configuration of the Route Searching Device 700>>

Next, the configuration of the route searching device 700 mentioned above will be explained.

As shown in FIG. 1, the route searching device 700 comprises an input unit 710, a position detection unit 720, and a recording unit 730. Moreover, the route searching device 700 comprises an acquisition unit 740A, a searching unit 750, a finding unit 760, and a calculation unit 770. Yet further, the route searching device 700 comprises a generation unit 780. Here, the calculation unit 770 functions as a first calculation unit and as a second calculation unit.

The input unit 710 mentioned above comprises a keyboard and so on. When, using the input unit 710, the user performs input of a route searching command in which a destination is set, that route searching command is sent to the acquisition unit 740A.

The position detection unit 720 mentioned above sequentially detects the current position of the moving body MV. And the position detection unit 720 sends this current position that it has detected to the acquisition unit 740A.

The recording unit 730 mentioned above records "map information". This "map information" includes position information for nodes (intersections and so on), road link information for roads connecting between nodes, travel time information, driving distance information, and energy consumption information for each road link, and information relating to road classifications and so on.

Moreover, the "map information" also includes "charging lane" section information, the amounts of electrical charge provided by those charging lanes per unit driving distance and per unit time, and information related to their charging up costs. Moreover, the "map information" includes position information for "charging spots", the amounts of electrical charge provided by those charging spots per unit time, and information related to their charging up costs.

The searching unit 750, the finding unit 760, and the calculation unit 770 are adapted to be able to access this recording unit 730 via the acquisition unit 740A.

The acquisition unit 740A mentioned above acquires the destination that was set in the route searching command inputted from the input unit 710. Moreover, the acquisition unit 740A acquires the current position sent from the position detection unit 720. The destination and the current position that have been acquired in this manner are sent to the searching unit 750.

Furthermore, the acquisition unit 740A acquires map information in the recording unit 730 in response to an acquisition request from the searching unit 750, from the finding unit 760, or from the calculation unit 770. And the acquisition unit 740A sends the map information that has thus been acquired to the searching unit 750, to the finding unit 760, or to the calculation unit 770.

Yet further, the acquisition unit 740A acquires the current value of the remaining energy amount sent from the ECU 920. The current value of the remaining energy amount that has been acquired in this manner is sent to the searching unit 750 and to the calculation unit 770.

The searching unit 750 mentioned above receives the current position and the destination from the acquisition unit 740A. Moreover, the searching unit 750 acquires "map information" in the recording unit 730 via the acquisition unit 740A. And in the first embodiment, on the basis of the current position and the destination, and while referring to the map information, the searching unit 750 first searches for, as a provisional route, the route to the destination for which the traveling time will be the shortest. Subsequently, the searching unit 750 sends information relating to this provisional route that has thus been found to the finding unit 760 and to the calculation unit 770.

Moreover, the searching unit 750 receives information related to "found charging lanes" and "found charging spots" which will be described hereinafter sent from the finding unit 760, and also receives a "charging lane running distance" and a "charging spot usage amount" which will likewise be described hereinafter sent from the calculation unit 770. Furthermore, the searching unit 750 receives the current value of the remaining energy amount sent from the acquisition unit 740A. And, on this basis of the above information, while referring to the map information, the searching unit 750 finds a first route from the current position to the destination that gives priority to charging by the use of "charging lanes", and a second route that gives priority to charging by the use of "charging spots". Information relating to the first route and the second route that have been found in this manner is sent to the generation unit 780 and to the calculation unit 770. The details of this processing performed by the searching unit 750 for searching the first route and the second route will be described hereinafter.

The finding unit 760 mentioned above receives information related to the provisional route sent from the searching unit 750. Moreover, the finding unit 760 acquires "map information" in the recording unit 730 via the acquisition unit 740A. And the finding unit 760 finds "charging lanes" that are present in the neighborhood of the provisional route on the basis of the information related to the provisional route and the map information. Subsequently, the finding unit 760 generates information related to "found charging lanes" including sectional information for the charging lanes that have been found (hereinafter these are sometimes also called the "found charging lanes"). The information related to the "found charging lanes" that has been generated in this manner is sent to the searching unit 750. Here, the "found charging lanes" is not limited to being present upon the provisional route.

Furthermore, the finding unit 760 finds "charging spots" that are present in the neighborhood of the provisional route on the basis of the information related to the provisional route and on the basis of the map information. And the finding unit 760 generates information related to "found charging spots" including positional information for the charging spots that have been found (hereinafter these are sometimes also called the "found charging spots"). The information related to "found charging spots" that has been generated in this manner is sent to the searching unit 750. Here, the "found charging spots" is not limited to being one that is present upon the provisional route.

The calculation unit 770 described above receives information related to the provisional route sent from the searching unit 750. Moreover, the calculation unit 770 receives the current value of the remaining energy amount sent from the acquisition unit 740A. Furthermore, the calculation unit 770 acquires "map information" in the recording unit 730 via the acquisition unit 740A.

And, on the basis of the information related to the provisional route and the map information, the calculation unit 770 calculates the amount of electrical power that is required for the moving body MV to travel to the destination. Next, the calculation unit 770 compares together this amount of electrical power that has been calculated and the current value of the remaining energy amount, and makes the first decision as to whether or not it is possible for the moving body MV to arrive at the destination without the battery 910 being charged up and with the first predetermined amount of energy (for example 10% of full charge) remaining. Subsequently, the calculation unit 770 sends the result of the first decision to the searching unit 750 and to the finding unit 760. Here, the "first predetermined amount" is determined in advance on the basis of experiment, simulation, experience and so on, from the standpoint of it being desirable for the battery still to have a minimum amount of remaining electrical charge when the moving body MV has reached the destination, in order for subsequent travel to be possible.

Furthermore, if the result of the first decision is negative, then, on the basis of the amount of electrical power that is required for the moving body MV to travel to the destination and the current value of the remaining energy amount, the calculation unit 770 calculates the running distance that the moving body MV needs to travel in a charging lane in order to travel to the destination (hereinafter sometimes this will be termed the "charging lane running distance"). The "charging lane running distance" that has been calculated in this manner is sent to the searching unit 750.

Moreover, on the basis of the amount of electrical power that is required for the moving body MV to travel to the destination and the current value of the remaining energy amount, the calculation unit 770 calculates the amount of charge that must be provided at a charging spot in order to travel to the destination (hereinafter sometimes this will be termed the "charging spot usage amount"). The "charging spot usage amount" that has been calculated in this manner is sent to the searching unit 750.

Even further, the calculation unit 770 receives information related to the first route and to the second route sent from the searching unit 750. And the calculation unit 770 refers to the map information, and, on the basis of this information related to the first route and to the second route, calculates the charging up cost and the expected traveling time required for each of them. Information related to these charging up costs and expected times required is sent to the generation unit 780.

The generation unit 780 described above receives the information related to the first route and to the second route sent from the searching unit 750. Moreover, for each of the first route and the second route, the generation unit 780 receives the information related to its charging up cost and the information related to its expected traveling time required that has been sent from the calculation unit 770. And the generation unit 780 generates information for presentation, in order to present the above described information to the user. The information for presentation that has been generated in this manner is sent to the presentation unit 790.

<Operation>

The operation of the route searching device 700 having the configuration described above will now be explained, with attention being principally directed to the route searching processing and to the processing for generating information for presentation on the basis of the results of that route searching processing.

First, the route searching processing performed by the route searching device 700 will be explained. It should be understood that it will be supposed that, during this route searching processing, the current position of the moving body MV that has been detected is sequentially sent from the position detection unit 720 to the acquisition unit 740A. Moreover, it will be supposed that the current value of the remaining amount of energy in the battery 910 is sequentially sent from the ECU 920 to the acquisition unit 740A.

And it will be supposed that the acquisition unit 740A acquires the above described current position and sends it to the searching unit 750. Moreover, it will be supposed that the acquisition unit 740A acquires the above described remaining energy amount and sends it to the searching unit 750 and to the calculation unit 770.

With this route searching device 700, when input is performed to the input unit 710 of a route searching command in which a destination is set and information to that effect is sent from the input unit 710 to the acquisition unit 740A, the acquisition unit 740A acquires this destination that has been set. And the acquisition unit 740A sends this destination that has thus been acquired to the searching unit 750.

Upon receipt of this destination sent from the acquisition unit 740A, on the basis of this destination and the newest current position sent from the acquisition unit 740A, and while referring to the map information in the recording unit 730, the searching unit 750 searches for the route from the current position to the destination for which the traveling time is the shortest and sets it as a provisional route, without taking into consideration the remaining energy amount at this time point. When the provisional route has been found in this manner, first, the searching unit 750 sends information related to the provisional route to the finding unit 760 and to the calculation unit 770.

Upon receipt of this information related to the provisional route, first, by referring to the map information in the recording unit 730, the calculation unit 770 calculates the amount of electrical power that will be required for the moving body MV to travel to the destination. And, on the basis of this amount of electrical power that has been calculated and the current value of the remaining energy amount, the calculation unit 770 makes a first decision as to whether or not it is possible for the moving body MV to arrive at the destination without charging up the battery 910 and with the first predetermined amount of energy remaining. Subsequently, the calculation unit 770 sends the result of this first decision to the searching unit 750 and to the finding unit 760.

Here, in the following explanation, an affirmative result of the first decision means a "decision that charging up will not be needed", while a negative result of the first decision means a "decision that charging up will be needed".

If the result of the first decision sent from the calculation unit 770 is a "decision that charging up will be needed", then, upon receipt of the information relating to the provisional route, the finding unit 760 finds "charging lanes" and "charging spots" that are located in the neighborhood of the provisional route, while referring to the map information in the recording unit 730. When one or more charging lanes have been found in this manner, the finding unit 760 generates information related to these "found charging lanes" that includes section information for these charging lanes that have been found, and sends this information to the searching unit 750. Moreover, when one or more charging spots have been found in this manner, the finding unit 760 generates information related to these "found charging spots" that includes positional information for these charging spots that have been found, and sends this information to the searching unit 750.

Note that, in the first embodiment, if the result of the first decision sent from the calculation unit 770 is a "decision that charging up will not be needed", then it is arranged for the finding unit 760 not to perform finding "charging lanes" and "charging spots".

Next, if the result of the first decision is a "decision that charging up will be needed", then the calculation unit 770 refers to the map information in the recording unit 730, and, on the basis of the amount of electrical power needed in order to travel to the destination and the current value of the remaining energy amount, calculates the "charging lane running distance", which is the running distance which the moving body MV must travel in one or more charging lanes. Moreover, the calculation unit 770 calculates the "charging spot usage amount", which is the amount of charging that needs to be performed at one or more charging spots in order to travel to the destination. When the "charging lane running distance" and the "charging spot usage amount" have been calculated in this manner, the calculation unit 770 sends this "charging lane running distance" and this "charging spot usage amount" to the searching unit 750.

Upon receipt of the information related to the "found charging lanes" and the "charging spots" that has been sent from the finding unit 760, and the "charging lane running distance" and the "charging spot usage amount" that have been sent from the calculation unit 770, the searching unit 750 searches for the first route and the second route from the current position to the destination.

(Searching Processing for the First Route)

During this searching processing for the first route, first, in the first embodiment, on the basis of the information related to the "found charging lanes", the searching unit 750 makes the second decision as to whether or not some found charging lane exists that can be arrived at from the departure position without performing charging at any found charging spot, while the second predetermined amount of energy (for example, 20% of full charge) is still remaining. And, if the result of the second decision is affirmative, then the searching unit 750 extracts this charging lane that can be arrived at as a candidate charging lane for supply of power. Here, the candidate charging lane for supply of power that is thus extracted is not limited to being present upon the provisional route. Moreover, the "second predetermined amount" is determined in advance on the basis of experiment, simulation, experience, and so on, from the standpoint of it being desirable to perform charging for subsequent traveling.

Subsequently, for each candidate charging lane for supply of power that has been extracted, the searching unit 750 derives one or more charging lane travel section candidates such that that the running distance along the charging lane becomes equal to the "charging lane running distance". Here, in the first embodiment, if the sectional distance of some candidate charging lane for supply of power is shorter than the "charging lane running distance" that has been calculated, then the searching unit 750 extracts, as the next candidate charging lane for supply of power, a charging lane that is present in the direction from that candidate charging lane for supply of power toward the destination, and moreover by traveling along which it is possible to arrive without performing charging at a charging spot. And the searching unit 750 derives the next charging lane travel section candidate so that the running distance along the next candidate charging lane for supply of power becomes a distance equal to the amount of shortfall from the "charging lane running distance". Then, the processing described above is repeated, until the total running distance in charging lanes becomes equal to the "charging lane running distance".

Note that, if the result of this second decision is negative, then, first, the searching unit 750 extracts, as a charging spot for supply of power, a found charging spot that is present between the departure position and the closest found charging lane upon the direction towards the destination and moreover to which the moving body MV can arrive with the remaining amount of energy at the present time point. And the searching unit 750 formulates a charging plan for performing charging up of the battery to the extent required for traveling to the closest found charging lane by passing via that charging spot for supply of power, and by using that charging spot for supply of power. Subsequently, the searching unit 750 takes that closest found charging lane as the candidate charging lane for supply of power, and derives a charging lane travel section on the basis of the amount of charge based upon the charging plan that employs this charging spot and the estimated remaining energy amount at that time point.

Moreover, if the total of the sectional distances of the candidate charging lanes for supply of power is less than the "charging lane running distance", if no charging lane exists in the direction from the candidate charging lane for supply of power to the destination at which it is possible to arrive without performing charging at a charging spot, then the searching unit 750 extracts a found charging spot at which the moving body MV is capable of arriving as a charging spot for supply of power. And the searching unit 750 formulates a charging plan for performing charging up of the battery to the extent required for traveling to the closest found charging lane by passing via that charging spot for supply of power, and by using that charging spot for supply of power. Subsequently, the searching unit 750 takes that closest found charging lane as the candidate charging lane for supply of power, and derives a charging lane travel section on the basis of the amount of charge based upon the charging plan that employs this charging spot and the estimated remaining energy amount at that time point.

Next, the searching unit 750 searches for the route that travels along the charging lane travel section candidate in the candidate charging lanes for supply of power that has been extracted and moreover for which the traveling time from the current position to the destination will become the shortest, while referring to the map information in the recording unit 730. And, from among the routes that travel over said candidate charging lane for supply of power that have been found, the searching unit 750 determines that route for which the traveling time becomes the shortest as being the first route.

(Searching Processing for the Second)

During this searching processing for the second route, in the first embodiment, on the basis of the information related to the "found charging spots", the searching unit 750 makes the third decision as to whether or not some found charging spot exists that can be arrived at from the departure position without performing charging in any charging lane, while the second predetermined amount of energy is still remaining. And, if the result of the third decision is affirmative, then the searching unit 750 extracts this charging spot that can be arrived at as a candidate charging spot for supply of power. Here, the candidate charging spot for supply of power that is thus extracted is not limited to being one that is present upon the provisional route.

Subsequently, for each candidate charging spot for supply of power that has been extracted, the searching unit 750 derives a candidate amount of charge such that that the amount of charge at that charging spot becomes the "charging spot usage amount". Here, in the first embodiment, if the "charging spot usage amount" exceeds the total amount by which the battery 910 can be charged up, then the searching unit 750 extracts, as the next candidate charging spot for supply of power, a charging spot that is present in the direction from that candidate charging spot for supply of power toward the destination, and moreover which can be arrived at without performing charging in a charging lane. And the searching unit 750 derives the next candidate amount of charge so that the amount of charge at the next candidate charging spot for supply of power becomes an amount of charge equal to the amount of shortfall from the "charging spot usage amount". After that, the processing described above is repeated, until the total amount of charge becomes the "charging spot usage amount".

Note that, if the result of the third decision is negative, then, first, the searching unit 750 extracts, as a charging lane for supply of power, a found charging lane that is present between the departure position and the found charging spot that is closest to the direction towards the destination and moreover to which the moving body MV can arrive with the remaining amount of energy at the present time point. And the searching unit 750 formulates a charging plan for performing charging up of the battery to the extent required for traveling to the closest found charging spot by passing via that closest charging lane for supply of power, and by using that charging lane for supply of power. Subsequently, the searching unit 750 takes that closest found charging spot as the candidate charging spot for supply of power, and derives an amount of charge on the basis of the amount of charge based upon the charging plan that employs this charging lane and the estimated remaining energy amount at that time point and so on.

Moreover, if the total of the amounts of charge at the candidate charging spots for supply of power is less than the "charging spot usage amount", and if no charging spot exists in the direction from the candidate charging spot for supply of power to the destination at which it is possible to arrive without performing charging in a charging lane, then the searching unit 750 extracts a found charging lane at which the moving body MV is capable of arriving as a charging lane for supply of power. And the searching unit 750 formulates a charging plan for performing charging up of the battery to the extent required for traveling to the closest found charging spot by passing via that charging lane for supply of power, and by using that charging lane for supply of power. Subsequently, the searching unit 750 takes that closest found charging spot as the candidate charging spot for supply of power, and derives an amount of charge on the basis of the amount of charge based upon the charging plan that employs this charging lane and the estimated remaining energy amount at that time point and so on.

Next, the searching unit 750 searches for the route that passes via the candidate charging spot for supply of power that has been extracted and upon which charging up of the candidate amount of charge is performed there, and moreover for which the traveling time from the current position to the destination, including the time for charging at the found charging spot, will become the shortest, while referring to the map information in the recording unit 730. And, from among the routes that pass via said candidate charging spot for supply of power that has been found, the searching unit 750 determines that route for which the traveling time becomes the shortest as being the second route.

Note that, if the result of the first decision sent from the calculation unit 770 is a "decision that charging up will not be needed", then the searching unit 750 takes the provisional route as the recommended route for presentation.

When the first route and the second route have been found in this manner, the searching unit 750 sends information related to the first route that has thus been found and related to the second route that has thus been found to the generation unit 780 and to the calculation unit 770. Upon receipt of this information related to the first route and to the second route, the calculation unit 770 refers to the map information, and calculates the charging up cost and the expected required traveling time, both for the first route and for the second route. And the calculation unit 770 sends this information that has thus been calculated related to these charging up costs and to these expected required traveling times to the generation unit 780.

Subsequently, on the basis of this information related to the first route and to the second route, and this information related to the charging up costs and the expected traveling times required both for the first route and for the second route, the generation unit 780 generates information for presentation for presenting this information to the user. And the generation unit 780 sends this information for presentation that has thus been generated to the presentation unit 790. As a result, the information for presentation related to the first route and to the second route is outputted by the presentation unit 790.

As has been explained above, with the first embodiment, the acquisition unit 740A acquires the current position of the moving body MV detected by the position detection unit 720, and sends that current position to the searching unit 750. Moreover, when a route searching command in which a destination has been set is inputted to the input unit 710, the acquisition unit 740A acquires the destination, and sends the destination to the searching unit 750. And, on the basis of the current position of the moving body MV and the destination, the searching unit 750 first searches for, as a provisional route, that route to the destination whose traveling time is the shortest.

Subsequently, on the basis of the current value of the remaining energy amount in the battery 910 sent from the acquisition unit 740A, the calculation unit 770 makes a decision as to whether or not it is possible for the moving body MV to arrive at the destination without charging up the battery 910. And if it has been decided that, at the current value of the remaining energy amount, it is not possible for the moving body MV to arrive at the destination without charging up the battery 910, then the finding unit 760 finds "charging lanes" and "charging spots" that are present in the neighborhood of the provisional route. Moreover, the calculation unit 770 calculates the shortfall amount of the remaining power amount in the battery 910 with respect to the amount of electrical power that is required in order for the moving body MV to travel to the destination, and, from this, calculates the "charging lane running distance" which is the distance that the moving body MV must travel in the charging lane. Furthermore, the calculation unit 770 calculates the "charging spot usage amount" which is the amount of charge that must be charged in a charging spot in order to travel to the destination.

Subsequently, on the basis of information related to the "charging lane running distance", the "found charging lanes", the estimated remaining energy amount, and so on, the searching unit 750 searches for the first route which gives priority to the utilization of charging lanes and which moreover keeps the charging up cost low. Moreover, on the basis of information related to the "charging spot usage amount", the "found charging spots", the estimated remaining energy amount, and so on, the searching unit 750 searches for the second route which gives priority to the utilization of charging spots and which moreover keeps the charging up cost low. And the searching unit 750 sends information related to the above first route and the above second route to the generation unit 780 and to the calculation unit 770.

Upon receipt of this information related to the above first route and second route, the calculation unit 770 refers to the map information, and calculates the charging up costs and the expected traveling times required, both for the first route and for the second route. And the calculation unit 770 sends information related to these charging up costs and these expected required traveling times that have thus been calculated to the generation unit 780. Next, on the basis of the information related to the above first route and second route and the charging up costs and the expected traveling times required both for the first route and for the second route, the generation unit 780 generates information for presentation for presenting this information, and sends the information for presentation that has thus been generated to the presentation unit 790. As a result, information for presentation related to the first route and to the second route is presented by the presentation unit 790.

Due to this, it is possible to searches for the first route that gives priority to charging in charging lanes, and the second route that gives priority to charging at charging spots, and it is possible, before setting off toward the destination, to present to the user information for presentation that includes the charging up costs, and the expected traveling times required, both for the first route and for the second route. As a result, it is possible for the user to select a route that is appropriate for his desires and requirements.

Thus, according to the first embodiment, it is possible to enhance the convenience for the user by performing route searching that includes a charging plan in which both charging lanes and also charging spots are both effectively utilized.

[The Second Embodiment]

Next, the second embodiment of the present invention will be explained with reference to FIG. 2.

<Configuration>

Figure 2:
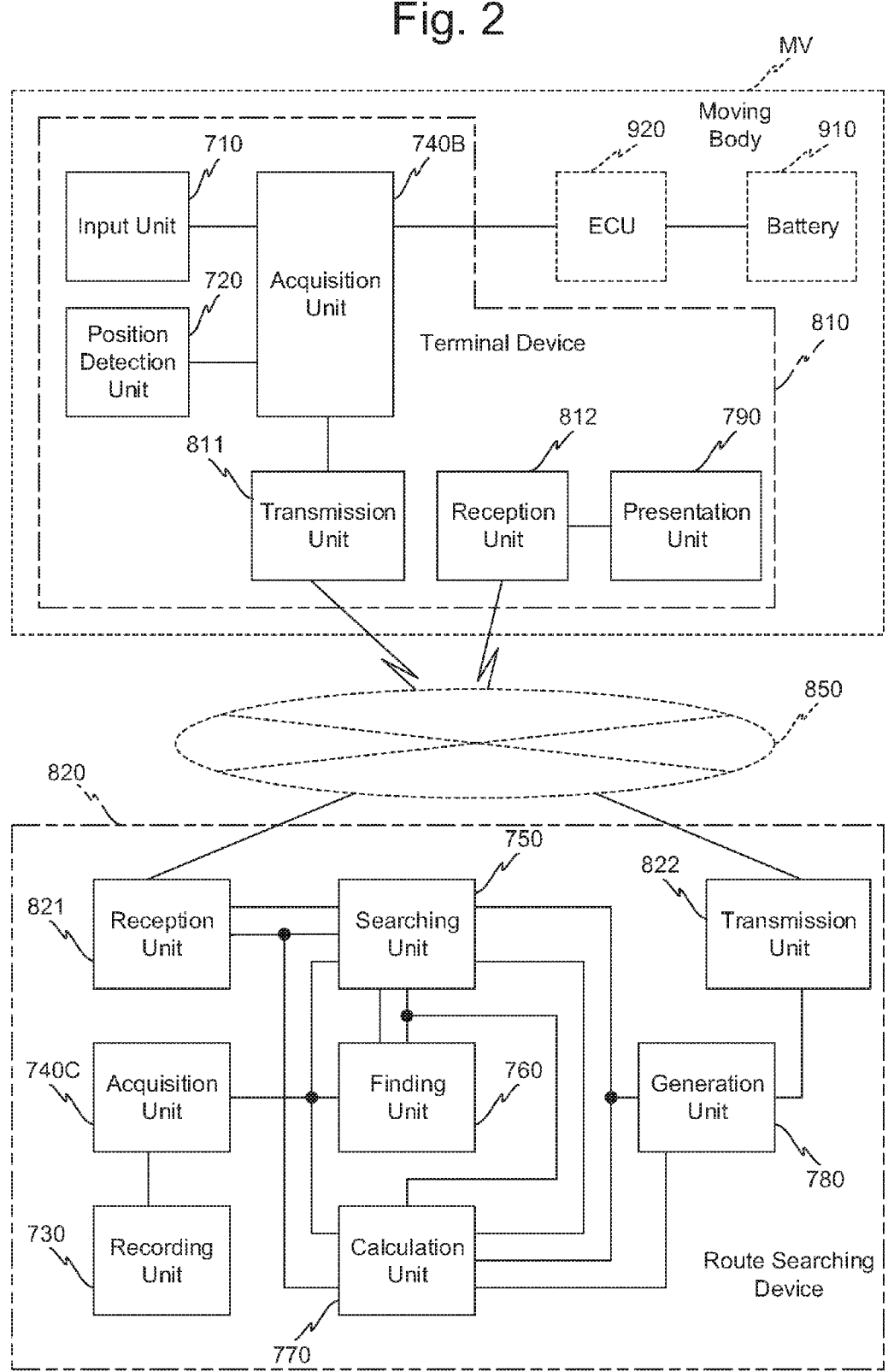
FIG. 2 is a block diagram showing the configuration of a terminal device and a route searching device according to the second embodiment of the present invention.

The configuration of a terminal device 810 and a route searching device 820 according to the second embodiment is shown in FIG. 2 as a block diagram. As shown in FIG. 2, the terminal device 810 is disposed within a moving body MV, and is connected to a battery 910 and an ECU 920 that are provided to the moving body MV. And the terminal device 810 and the route searching device 820 are adapted to be capable of communicating with one another via a network 850.

Note that, while the route searching device 820 is adapted to be also capable of communicating with other terminal devices that are structured similarly to the terminal device 810, only the terminal device 810 is shown in FIG. 2 as a representative.

<<Configuration of the Terminal Device 810>>

As shown in FIG. 2, the terminal device 810 comprises an input unit 710, a position detection unit 720, an acquisition unit 740B, and a presentation unit 790. Moreover, the terminal device 810 comprises a transmission unit 811 and a reception unit 812.

In other words, as compared to the route searching device 700 of the first embodiment described above (refer to FIG. 1), the terminal device 810 differs by the feature that the recording unit 730, the searching unit 750, the finding unit 760, the calculation unit 770, and the generation unit 780 are not provided thereto, by the feature that the acquisition unit 740B is provided thereto instead of the acquisition unit 740A, and by the feature that the presentation unit 790, the transmission unit 811, and the reception unit 812 are also provided thereto. The following explanation will principally focus upon these features of difference.

The acquisition unit 740B described above acquires a destination that has been set in a route searching command sent from the input unit 710 and the current position sent from the position detection unit 720. Moreover, the acquisition unit 740B acquires the current value of the remaining amount of energy sent from the ECU 920. The destination, the current position, and the current value of the remaining energy amount that have been acquired in this manner are sent to the transmission unit 811 as transmitted terminal data.

The transmission unit 811 described above receives the transmitted terminal data sent from the acquisition unit 740B. And the transmission unit 811 transmits this transmitted terminal data to the route searching device 820 via the network 850.

The reception unit 812 described above receives information for presentation related to the first route and to the second route sent from the route searching device 820 via the network 850 (this information will also sometimes be termed "transmitted server data"). And the reception unit 812 sends this information for presentation related to the first route and to the second route to the presentation unit 790.

<<Configuration of the Route Searching Device 820>>

As shown in FIG. 2, the route searching device 820 comprises a recording unit 730, an acquisition unit 740C, a searching unit 750, a finding unit 760, a calculation unit 770, and a generation unit 780. Moreover, the route searching device 820 comprises a reception unit 821 and a transmission unit 822.

In other words, as compared to the route searching device 700 of the first embodiment described above (refer to FIG. 1), the route searching device 820 differs by the feature that the input unit 710 and the position detection unit 720 are not provided thereto, by the feature that the acquisition unit 740C is provided thereto instead of the acquisition unit 740A, and by the feature that the reception unit 821 and the transmission unit 822 are also provided thereto.

Upon receipt of an acquisition request from the searching unit 750, the finding unit 760, and the calculation unit 770, the acquisition unit 740C described above acquires map information in the recording unit 730. And the acquisition unit 740C sends this map information that has thus been acquired to the searching unit 750, to the finding unit 760, and to the calculation unit 770.

The reception unit 821 described above receives the transmitted terminal data sent from the terminal device 810 via the network 850. And the reception unit 821 sends the destination and the current position included in this transmitted terminal data to the searching unit 750. Moreover, the reception unit 821 sends the current value of the remaining energy amount included in the transmitted terminal data to the searching unit 750 and to the calculation unit 770.

The transmission unit 822 described above receives information for presentation related to the first route and to the second route sent from the generation unit 780. And the transmission unit 822 transmits this information for presentation related to the first route and to the second route to the terminal device 810 via the network 850.

With the configuration for the terminal device 810 and the route searching device 820 as described above, it is arranged for the destination and the current position that have been acquired by the acquisition unit 740B of the terminal device 810 to be sent to the searching unit 750 of the route searching device 820 via the transmission unit 811, the network 850, and the reception unit 821. Moreover, it is arranged for the current value of the remaining energy amount that has been acquired by the acquisition unit 740B of the terminal device 810 to be sent to the searching unit 750 and the calculation unit 770 of the route searching device 820 via the transmission unit 811, the network 850, and the reception unit 821.

Furthermore, it is arranged for the information for presentation related to the first route and to the second route generated by the generation unit 780 of the route searching device 820 to be sent to the reception unit 812 of the terminal device 810 via the transmission unit 822 and the network 850.

<Operation>

The explanation will now principally be focused upon the route searching processing and upon the processing for generating information for presentation on the basis of the results of that route searching processing that the terminal device 810 and the route searching device 820 having the configuration described above execute in mutual cooperation.

First, the route searching processing will be explained. It should be understood that it will be supposed that, during this route searching processing, the current position of the moving body MV is sequentially sent from the position detection unit 720 to the acquisition unit 740B. Moreover, it will be supposed that the current value of the remaining energy amount in the battery 910 is sequentially sent from the ECU 920 to the acquisition unit 740B.

And it will be supposed that the acquisition unit 740B acquires that current position and sends it to the searching unit 750 of the route searching device 820 via the network 850. Moreover, it will be supposed that the acquisition unit 740B acquires the above described current value of the remaining energy amount, and sends it to the searching unit 750 and the calculation unit 770 of the route searching device 820 via the network 850.

When input of a route searching command in which a destination has been set is performed to the input unit 710 of the terminal device 810 and the content thereof is sent from the input unit 710 to the acquisition unit 740B, the acquisition unit 740B acquires the destination that has thus been set. And the acquisition unit 740B sends this destination that has thus been acquired to the searching unit 750 of the route searching device 820 via the network 850.

Upon receipt of this destination, in a similar manner to the case with the first embodiment described above, on the basis of this destination and the current position most recently transmitted from the terminal device 810, and while referring to the map information in the recording unit 730, the searching unit 750 searches for, as a provisional route, the route from the current position to the destination for which the traveling time becomes shortest, without taking into consideration the remaining energy amount at this time point. When the provisional route has been found in this manner, the searching unit 750 first sends information related to the provisional route that has thus been found to the finding unit 760 and to the calculation unit 770.

And, upon receipt of this information related to the provisional route, first, in a manner similar to the case with the first embodiment described above, the calculation unit 770 makes the first decision as to whether or not it is possible for the moving body MV to arrive at the destination without performing charging of the battery 910. And the calculation unit 770 sends the result of the first decision to the searching unit 750 and to the finding unit 760.

If the result of the first decision sent from the calculation unit 770 is a "decision that charging up will be needed", then, in a manner similar to the case with the first embodiment described above, the finding unit 760, which has received the information related to the provisional route, generates information related to "found charging lanes" and "found charging spots". And the finding unit 760 sends this information related to "found charging lanes" and "found charging spots" to the searching unit 750.

Subsequently, the calculation unit 770 calculates a "charging lane running distance" and a "charging spot usage amount", in a manner similar to the case with the first embodiment described above. And the calculation unit 770 sends this "charging lane running distance" and this "charging spot usage amount" to the searching unit 750.

Upon receipt of the information related to "found charging lanes" and "found charging spots" sent from the finding unit 760 and the "charging lane running distance" and the "charging spot usage amount" sent from the calculation unit 770, the searching unit 750 searches for the first route and the second route in a manner similar to the case with the first embodiment described above. And the searching unit 750 sends information related to the first route and the second route that have thus been found to the generation unit 780 and to the calculation unit 770.

Upon receipt of this information related to the first route and the second route, in a manner similar to the case with the first embodiment described above, the calculation unit 770 calculates a charging up cost and an expected traveling time required for each of the first route and the second route. And the calculation unit 770 sends information related to these charging up costs and these expected traveling times required that have thus been calculated to the generation unit 780.

Subsequently, in a manner similar to the case with the first embodiment described above, on the basis of the information related to the first route and the second route, and on the basis of the charging up costs and the expected traveling times required for each of the first route and the second route, the generation unit 780 generates information for presentation related to the first route and to the second route. And the generation unit 780 sends this information for presentation related to the first route and to the second route to the reception unit 812 of the terminal device 810 via the network 850.

And then, upon receipt of the information for presentation related to the first route and to the second route, the reception unit 812 sends this information for presentation related to the first route and to the second route to the presentation unit 790. As a result, the information for presentation related to the first route and to the second route is outputted by the presentation unit 790, in a manner similar to the case with the first embodiment described above.

As has been explained above, in the second embodiment, the acquisition unit 740B of the terminal device 810 acquires the current position of the moving body MV that has been detected by the position detection unit 720, and transmits this current position to the searching unit 750 of the route searching device 820. Moreover, when input of a route searching command in which a destination has been set is performed to the input unit 710 of the terminal device 810, the acquisition unit 740B acquires the destination, and transmits the destination to the searching unit 750 of the route searching device 820. And first, on the basis of the current position of the moving body MV and the destination, the searching unit 750 searches for the route to the destination for which the traveling time becomes the shortest as the provisional route.

Subsequently, on the basis of the remaining energy amount in the battery 910 which has been transmitted from the terminal device 810, the calculation unit 770 of the route searching device 820 makes a decision as to whether or not it is possible for the moving body MV to arrive at the destination without performing charging of the battery 910. And if it is decided that, with the current value of the remaining amount of energy, it is not possible for the moving body MV to arrive at the destination without performing charging of the battery, then the finding unit 760 finds "charging lanes" and "charging spots" that are located in the neighborhood of the provisional route. Moreover, the calculation unit 770 calculates the shortfall amount of the remaining amount of power in the battery 910 with respect to the amount of electrical power that the moving body MV requires in order to travel to the destination, and calculates the "charging lane running distance", which is the distance that the moving body MV needs to travel in one or more charging lanes. Furthermore, the calculation unit 770 calculates the "charging spot usage amount", which is the amount of charge that needs to be charged into the battery at one or more charging spots in order for the moving body MV to travel to the destination.

Subsequently, on the basis of the information related to the "charging lane running distance" and the "found charging lanes", and on the basis of the estimated remaining amount of energy and so on, the searching unit 750 searches for the first route that gives priority to the usage of charging lanes, and that moreover keeps the charging up cost down. Moreover, on the basis of the information related to the "charging spot usage amount" and the "found charging spots", and on the basis of the estimated remaining amount of energy and so on, the searching unit 750 searches for the second route that gives priority to the usage of charging spots, and that moreover keeps the charging up cost down. And the searching unit 750 sends information related to the above first route and second route to the generation unit 780 and to the calculation unit 770.

Upon receipt of this information related to the first route and to the second route, the calculation unit 770 refers to the map information, and, for each of the first route and the second route, calculates the charging up cost and the expected traveling time required. And the calculation unit 770 sends these charging up cost and these expected traveling time required that have thus been calculated to the generation unit 780. Next, on the basis of the information related to the first route and to the second route and information related to the charging up cost and the expected traveling time required for each of the first route and the second route, and the generation unit 780 generates information for presentation in order to present this information and transmits it to the terminal device 810. As a result, the information for presentation related to the first route and to the second route is presented by the presentation unit 790.

Due to this, in a similar manner to the case with the first embodiment described above, it is possible to find the first route that gives priority to charging in charging lanes and the second route that gives priority to charging in charging spots, and, before setting off to the destination, it is possible to present to the user information for presentation that includes the charging up cost and the expected traveling time required related to both the first route and the second route. As a result, the user is able to select the route that best conforms to his requirements and desires.

Thus, according to the second embodiment of the present invention, in a similar manner to the case with the first embodiment, it is possible to enhance the convenience for the user by performing route searching that includes a charging plan in which both charging lanes and also charging spots are effectively utilized.

[Modification of the Embodiments]

The present invention is not to be considered as being limited to the embodiments described above; modifications of various kinds are possible to implement thereto.

For example while, in the first and second embodiments described above, the searching unit searched for, as the provisional route, that route to the destination for which the traveling time was shortest, it would also be acceptable to arrange for the searching unit to search for, as the provisional route, that route for which the running distance is shortest.

Moreover, in the first and second embodiments described above, it was arranged for the calculation unit to calculate the amount of electrical power needed for the moving body to travel to the destination, and, on the basis of this amount of electrical power that has been calculated and the current value of the remaining amount of energy in the battery, to calculate the running distance that the moving body MV must travel in a charging lane in order to travel to the destination (i.e. the charging lane running distance). And it was arranged for the searching unit to search for the first route to the destination on the basis of that charging lane running distance and so on.

By contrast, it would also be acceptable to arrange for the calculation unit to calculate, on the basis of the above amount of electrical power that has been calculated and the current value of the remaining amount of energy in the battery, the traveling time that the moving body MV must travel in a charging lane in order to travel to the destination (i.e. the charging lane traveling time). And it may be arranged for the searching unit to search for the first route to the destination on the basis of the above charging lane traveling time.

And it would also be acceptable to arrange for the calculation unit to calculate both the above charging lane traveling time and also the above charging lane running distance. In this case, it may be arranged for the searching unit to search for the first route to the destination on the basis of both the above charging lane traveling time and also the above charging lane running distance.

Furthermore while, in the first, second, and third decisions in the above first and second embodiments described above, it was arranged to acquire the above described amount of electrical power that is required in order to travel to the destination from the map data and to utilize it directly, it would also be acceptable to arrange, for example, to multiply this amount of electrical power by a coefficient that is based upon the electrical power consumption characteristics of the moving body MV and/or its past traveling record and so on.

Yet further, while it was arranged to perform the first, second, and third decisions in the first and second embodiments described above by comparing together the remaining amount of energy of the moving body MV and the amount of electrical power that is required in order to travel to the ground point that is the subject of those decisions, it would also be acceptable, for example, to arrange to perform these decisions by comparing together distance information for the estimated possible range acquired by the external ECU 920 and the distance to the ground point that is the subject of those decisions.

Even further, while in the first and second embodiments described above the searching unit searched for the route to the destination for which the traveling time was the shortest, it would also be acceptable to arrange to search for the route for which the running distance is the shortest.

Furthermore, while in the first and second embodiments described above it was arranged to calculate the expected times required for travel to the destination as the information for presentation related to the found routes, it would also be acceptable to arrange to calculate the expected time point of arrival at the destination, or to calculate both the expected traveling time required and also the expected time point of arrival.

And it would also be acceptable to arrange for the searching unit to search for, as the provisional route, provisional routes of two types: a provisional route employing tolls in which no limitation is imposed upon traveling while utilizing toll roads, and a cost avoidance provisional route in which travel upon toll roads is avoided. In this case, the searching unit would search for the first route and the second route for traveling while not imposing any limitation upon the usage of toll roads on the basis of the provisional route employing tolls, and would also search for the first route and the second route for traveling while avoiding toll roads on the basis of the cost avoidance provisional route. And then it would be acceptable to arrange for the generation unit to generate information for presentation on the basis of all of these routes that have been found.

Note that, as the information for presentation for the first and second route for traveling while not imposing any limitation upon the usage of toll roads, it would be possible to arrange to present the information related to the costs of traveling upon toll roads all together.

Moreover, in the first embodiment described above it was arranged for the route searching device 700 to include the input unit 710 and the position detection unit 720, while in the second embodiment described above it was arranged for the terminal device 810 to include the input unit 710 and the position detection unit 720. By contrast, if some other device is provided with an element, among the above elements, that can be shared, then it would also be acceptable, by employing that sharable element, to arrange to omit that sharable element as a structural element of the route searching device of the first embodiment or of the terminal device of the second embodiment.

Still further, in the first and second embodiments described above, it was arranged for the current value of the remaining energy amount to be reported from the external ECU 920. By contrast, if it is difficult to receive the report of the current value of the remaining energy amount from the exterior, then it would be possible to provide a sensor or the like for detecting the remaining energy amount.

Furthermore, although in the second embodiment it was arranged for the route searching device 820 to include the searching unit, the finding unit, the calculation unit, and the generation unit, it would also be possible, for example, for the generation unit to be provided as a structural element of the terminal device.

Moreover while it was arranged not to include the presentation unit in the route searching device of the first embodiment described above, it would also be acceptable to arrange for the route searching device of the first embodiment to include the presentation unit. Yet further, although it was arranged to include the presentation unit in the terminal device of the second embodiment described above, if there is an already existing presentation unit that can be employed, then it would be acceptable to arrange for this already existing presentation unit to be employed, and for the terminal device not to include any presentation unit.

Yet further, it would be acceptable for the route searching device of the first embodiment described above or for the terminal device of the second embodiment described above to be a device that has a screen display function, such as a smart phone or the like; and also it would be possible for the route searching device of the second embodiment described above to be a personal computer that is set up in a household.

Moreover, in the first and second embodiments described above, it was arranged for information related to charging facilities, such as "charging lane" section information and "charging spot" position information and so on, to be recorded in the recording unit. By contrast, it would also be acceptable to arrange for such information related to charging facilities to be acquired from an external system server.

Even further while, in the first and second examples described above, by way of example, the present invention was applied to a device that was provided to an electric automobile, it would of course also be possible to apply the present invention to a device that is provided to a vehicle that utilizes electrical energy for only a portion of its propulsion energy (for example, a hybrid vehicle).

It should be understood that it would be acceptable to arrange to implement the acquisition unit, the searching unit, the finding unit, the calculation unit, and the generation unit of the route searching device according to the first embodiment described above as a computer that constitutes a calculation means and that is equipped with a central processing device (CPU: Central Processing Unit) and so on, and to arrange for a part or the entirety of the processing performed by these elements to be implemented by a program that is prepared in advance being executed by that computer. This program would be recorded upon a recording medium that can be read by the computer, such as a hard disk, a CD-ROM, a DVD or the like, and would be executed by being loaded from the recording medium by the computer. Moreover, it would also be acceptable to arrange for this program to be acquired in the format of being recorded upon a transportable recording medium such as a CD-ROM, a DVD or the like, or to be acquired in the format of being distributed via a network such as the internet or the like.

Moreover, it would be acceptable to arrange to implement the acquisition unit of the terminal device of the second embodiment described above, and the acquisition unit, the searching unit, the finding unit, the calculation unit, and the generation unit of the route searching device of the second embodiment described above thereof, as computers each of which constitutes a calculation means which is equipped with a central processing device (CPU: Central Processing Unit) and so on, and to arrange for a part or the entirety of the processing performed by these elements to be implemented by programs that are prepared in advance being executed by those computers. Each of these programs would be recorded upon a recording medium that can be read by the computer, such as a hard disk, a CD-ROM, a DVD or the like, and would be executed by being loaded from the recording medium by the computer. Moreover, it would also be acceptable to arrange for this program to be acquired in the format of being recorded upon a transportable recording medium such as a CD-ROM, a DVD or the like, or to be acquired in the format of being distributed via a network such as the internet or the like.

EXAMPLES

In the following, examples of the present invention will be explained with reference to the appended drawings. Note that, in the following explanation and drawings, the same reference symbols are appended to elements that are the same or equivalent, and duplicated explanation will be omitted.

[The First Example]

First, the first example of the present invention will be explained with principal reference being made to FIGS. 3 through 13.

<Configuration>

Figure 3:
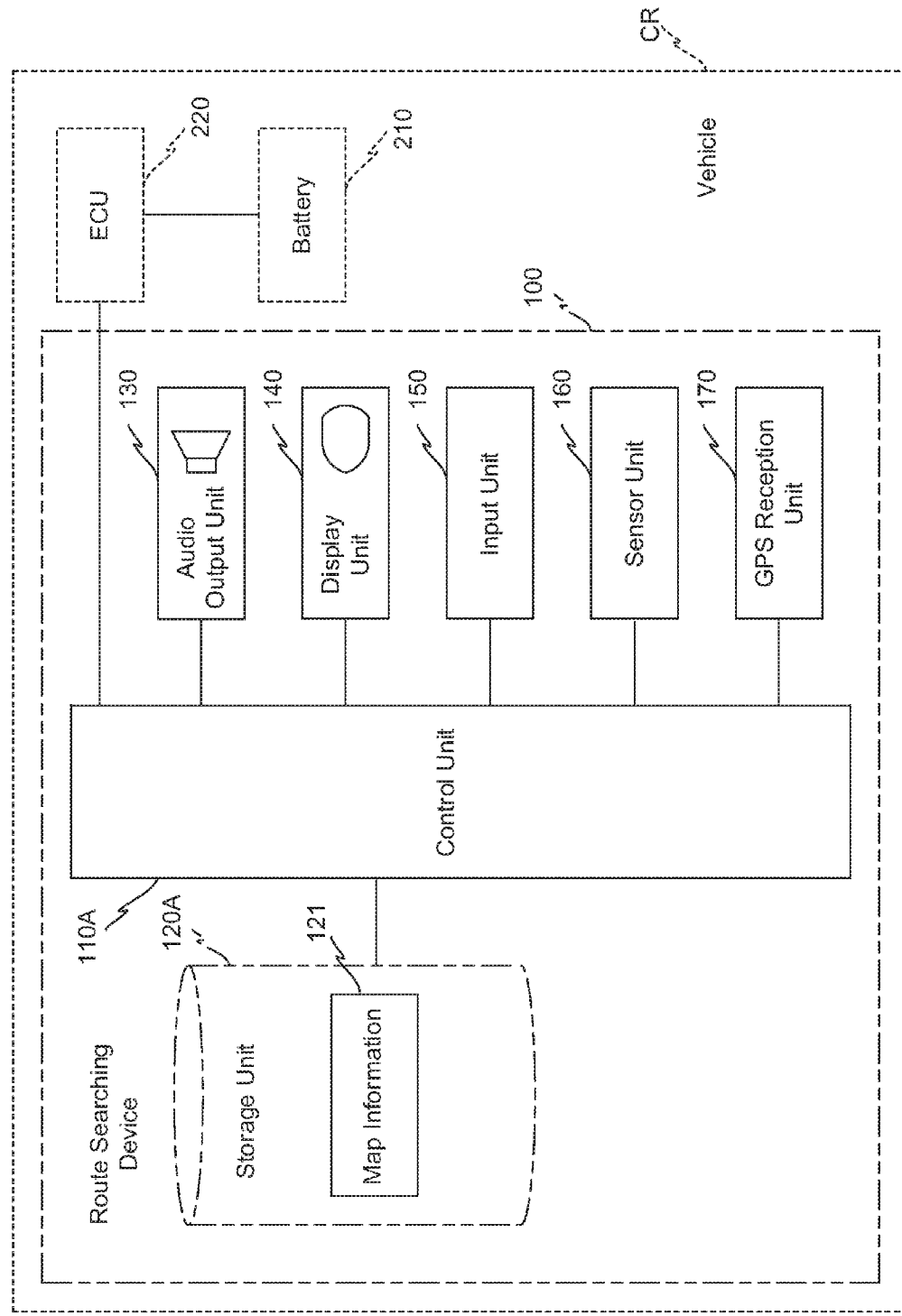
FIG. 3 is a block diagram schematically showing the configuration of a route searching device according to the first example of the present invention.

The schematic configuration of a route searching device according to the first example is shown in FIG. 3 as a block diagram. The route searching device 100 is one aspect of the route searching device 700 of the first embodiment described above (refer to FIG. 1).

The route searching device 100 is disposed within an electric automobile CR (hereinafter termed the "vehicle CR") that utilizes electrical energy for all its propulsion energy. Here, the vehicle CR corresponds to the moving body MV. In the first example, a battery 210 and an ECU 220 are provided to the vehicle CR.

Energy for propelling the vehicle CR is accumulated in the battery 210 mentioned above. The vehicle CR is driven by employing this energy for propulsion. Energy for propulsion can be charged into this battery 210 in "charging lanes", at "charging spots", at the home of the user, and so on.

The ECU 220 mentioned above collects the results of detection by sensors of various types that detect the state of the vehicle CR. And, on the basis of these detection results that have thus been collected, the ECU 220 sequentially derives the values of parameters of various kinds that are useful for controlling the traveling of the vehicle CR, and performs control and management of the traveling of the vehicle CR.

In the first example, the current value of the remaining amount of energy in the battery 210 (i.e. the remaining electrical power amount) is included in these parameter values that are derived by the ECU 220. And the ECU 220 sends this current value of the remaining energy amount in the battery 210 to the route searching device 100 via an in-vehicle communication network that operates according to a communication protocol such as, for example, a CAN (Controller Area Network) or the like.

<<Configuration of the Route Searching Device 100>>

Next, the configuration of the route searching device 100 mentioned above will be explained.

As shown in FIG. 3, the route searching device 100 comprises a control unit 110A and a storage unit 120A. Moreover, the route searching device 100 comprises an audio output unit 130, a display unit 140, and an input unit 150. Yet further, the route searching device 100 comprises a sensor unit 160 and a GPS (Global Positioning System) reception unit 170.

Here, the storage unit 120A fulfills the function of the recording unit 730 described above. Moreover, the audio output unit 130 and the display unit 140 fulfill the function of the presentation unit 790 described above. Furthermore, the GPS reception unit 170 fulfills the function of the position detection unit 720 described above.

Along with controlling the entire route searching device 100 as a whole, the control unit 110A mentioned above also executes processing of various kinds. This control unit 110A will be described hereinafter.

The storage unit 120A mentioned above comprises a non-volatile storage device such as a hard disk device or the like, and stores information and data of various kinds used by the route searching device 100. Map information 121 and so on is included in this information and data. The control unit 110A is capable of accessing this storage unit 120A.

The map information 121 includes node position information, road link information for roads joining between the nodes, traveling time information and running distance information and energy consumption information for each road link, and information related to road classifications and so on. Here "road classification" means whether a road is a high speed road, or a normal road, or a toll road or the like. And, in relation to toll roads, information related to the fees to be paid for travel upon such toll roads is included.

Moreover, the map information 121 also includes "charging lane" section information and information related to the amounts of electrical charge received per unit running distance or per unit time upon such charging lanes and to the costs for such charging up. Yet further, the map information 121 also includes position information for "charging spots" and information related to the amounts of electrical charge per unit time received at such charging spots and to the costs for such charging up.

The audio output unit 130 mentioned above comprises a speaker, and outputs audio corresponding to audio data received from the control unit 110A. Under control by the control unit 110A, this audio output unit 130 outputs guidance audio such as information for presentation related to the first route and the second route and the like.

The display unit 140 mentioned above comprises a display device such as a liquid crystal panel or the like, and displays images corresponding to display data received from the control unit 110A. Under control by the control unit 110A, this display unit 140 displays images and guidance information and so on, such as information for presentation related to the first route and the second route and the like.

The input unit 150 mentioned above comprises a key unit that is provided to a main body portion of the route searching device 100, and/or a remote input device or the like to which a key unit is provided. Here, a touch panel that is provided to a display device of the display unit 140 may be used as the key unit that is provided to the main body portion. Note that, instead of providing a key unit, or in parallel therewith, it would also be possible to employ a configuration in which audio is inputted and an audio recognition technique is employed.

Settings and operational commands related to the details of the operation of the route searching device 100 are made by the user actuating this input unit 150. For example, the user may input a route searching command in which a destination is specified by employing the input unit 150. Input details of this sort are sent from the input unit 150 to the control unit 110A as input data.

The sensor unit 160 mentioned above comprises a vehicle speed sensor, an acceleration sensor, an angular velocity sensor, a tilt sensor, and so on. The results of detection by such sensors of various types that are provided to the sensor unit 160 are sent to the control unit 110A as sensor data.

The GPS reception unit 170 mentioned above calculates the current position of the vehicle CR on the basis of the results of reception of radio waves transmitted from a plurality of GPS satellites. Moreover, the GPS reception unit 170 monitors the present time instant on the basis of date and time information sent from the GPS satellites. This information related to the current position and the present time instant is sent to the control unit 110A as GPS data.

Next, the control unit 110A mentioned above will be explained. Along with controlling the entire route searching device 100 as a whole, this control unit 110A also executes processing of various kinds. This control unit 110A comprises a central processing device (i.e. a CPU) that serves as a calculation means, and peripheral circuitry thereof. Functions of the route searching device 100 of various types are implemented by the control unit 110A executing programs of various kinds. The functions of the acquisition unit 740A, the searching unit 750, the finding unit 760, the calculation unit 770, and the generation unit 780 in the first embodiment described above are included among these functions. The details of the processing executed by this control unit 110A will be described hereinafter.

It should be understood that the program executed by the control unit 110A is recorded upon a recording medium that can be read by a computer, such as a hard disk, a CD-ROM, a DVD or the like, and is executed by being loaded from that recording medium by the computer. Moreover, this program may be acquired in a format recorded upon a transportable recording medium such as a CD ROM, a DVD or the like; or it could also be acquired in a format distributed via a network such as the internet or the like.

On the basis of traveling data received from the sensor unit 160 and GPS data received from the GPS reception unit 170, the control unit 110A refers to the map information 121 in the storage unit 120A as appropriate, and performs processing in order to provide navigation information to the user. This type of navigation information supply processing includes: (a) map display for displaying maps upon the display unit 140 of regions that the user designates; (b) map matching for calculating where the position of the vehicle CR is upon the map and toward what azimuth the vehicle CR is facing; (c) searching for a recommended route from the current position of the vehicle CR to a destination that the user designates; (d) creation of travel guidance information on the basis of such recommended routes; and (e) processing for performing guidance display using the display unit 140 and for performing audio guidance using the audio output unit 130, in order to present the information for presentation related to map matching results and found route.

<Operation>

The operation of the route searching device 100 having the configuration as described above will now be explained, with attention being principally directed to route searching processing for finding the "first route" in which priority is given to charging in charging lanes and the "second route" in which priority is given to charging at charging spots, and to processing for presenting information for presentation related to the first route and to the second route by the control unit 110A.

Note that it will be supposed that the results of detection by sensors of various types are sequentially sent from the sensor unit 160 to the control unit 110A. And it will be supposed that the current value of the remaining energy amount is sequentially sent from the ECU 220 to the control unit 110A. Moreover, it will be supposed that information related to the current position and to the present time instant is sequentially sent as GPS data from the GPS reception unit 170 to the control unit 110A.

And it will be supposed that the control unit 110A sequentially performs map matching on the basis of the sensor data sent from the sensor unit 160 and on the basis of the GPS data sent from the GPS reception unit 170. Note that the control unit 110A is adapted to employ the position on the map that has been obtained by the map matching as the current position of the vehicle CR.

Figure 4:
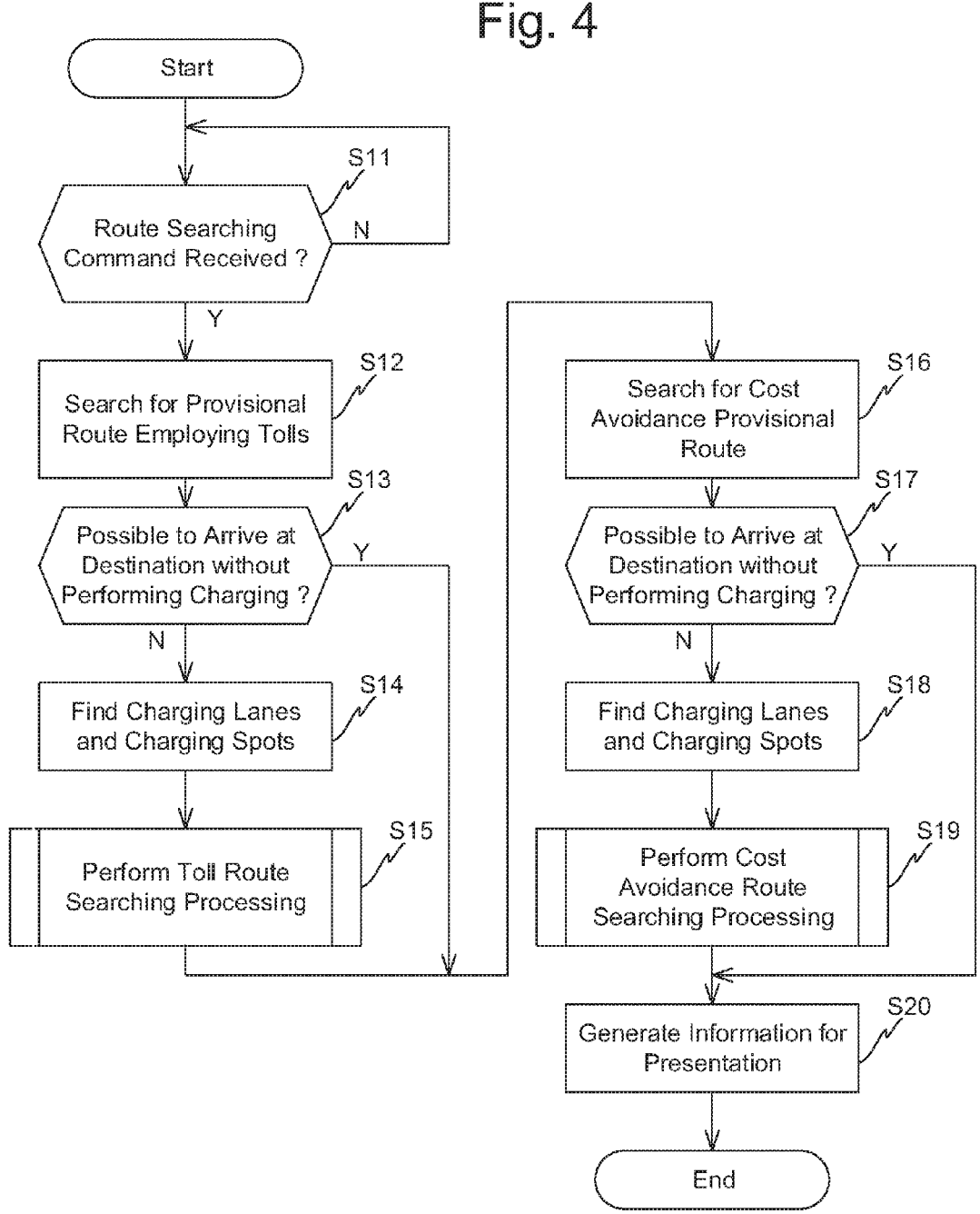
FIG. 4 is a flow chart for explanation of route searching processing performed by the device of FIG. 3, and for explanation of presentation processing for information for presentation relating to a route that has been found.

Searching processing for the first route and for the second route is executed by the control unit 110A on the basis of the above operational environment. During this route searching processing, as shown in FIG. 4, first, in a step S11 the control unit 110A makes a decision as to whether or not a route searching command in which a destination has been set has been inputted to the input unit 150. If the result of the decision is negative, then the processing of the step S11 is repeated.

When a route searching command is inputted to the input unit 150 and the result of the decision in the step S11 is affirmative (Y in the step S11), then the flow of control proceeds to a step S12. In the step S12, the control unit 110A performs searching for a "provisional route with tolls" while referring to the map information 121 in the storage unit 120A on the basis of the destination that has been designated in the route searching command and the current position that has been most recently sent. In the first example, as this "provisional route with tolls", the control unit 110A is adapted to search for the route for which the traveling time while traveling becomes shortest, without any limitation upon the usage of toll roads, and without taking into consideration the remaining energy amount at the time point.

Next, in a step S13, on the basis of the current value of the remaining energy amount, the control unit 110A makes a decision as to whether or not the vehicle CR is capable of arriving at the destination by traveling upon the provisional route employing tolls with the first predetermined amount of energy still remaining, without charging of the battery 210 being performed. The decision is made by the control unit 110A referring to the map information 121, calculating the amount of electrical power that is required for traveling to the destination while traveling upon the provisional route employing tolls, and comparing this amount of electrical power that has thus been calculated with the current value of the remaining energy amount. If the result of the decision is affirmative (Y in the step S13), then the flow of control is transferred to a step S16 that will be described hereinafter.

On the other hand, if the result of the decision in the step S13 is negative (N in the step S13), then the flow of control proceeds to a step S14. In the step S14, the control unit 110A refers to the map information 121, and finds charging lanes that are present in the neighborhood of the provisional route employing tolls as being "found charging lanes". Moreover, the control unit 110A finds charging spots that are present in the neighborhood of the provisional route employing tolls as being "found charging spots".

And next, in a step S15, "toll road searching processing" for traveling without any limitation upon the usage of toll roads is performed. The details of the processing in the step S15 will be described hereinafter.

Next, in a step S16, on the basis of the destination and the most recent current position that has been sent, the control unit 110A performs searching for a "cost avoidance provisional route" while referring to the map information 121. In the first example, as the "cost avoidance provisional route", it is arranged to search for the route for which the traveling time becomes shortest, while avoiding traveling upon toll roads.

Next, in a step S17, on the basis of the current value of the remaining energy amount, the control unit 110A makes a decision as to whether or not it is possible for the vehicle CR to arrive at the destination with the first predetermined amount of energy remaining by traveling along the cost avoidance provisional route without charging up the battery. If the result of the decision is affirmative (Y in the step S17), then the flow of control is transferred to a step S20 which will be described hereinafter.

On the other hand, if the result of the decision in the step S17 is negative (N in the step S17), then the flow of control proceeds to a step S18. In the step S18, the control unit 110A refers to the map information 121, and finds charging lanes and charging spots that are present in the neighborhood of the cost avoidance provisional route as being "found charging lanes" and "found charging spots".

Next, in a step S19, "cost avoidance route searching processing" is performed for traveling while avoiding toll roads. The details of this processing in the step S19 will be described hereinafter.

Then, in a step S20 the control unit 110A generates information for presentation related to the results of the searches. Here, if the result of the decision in the step S13 is affirmative, then the control unit 110A generates information for presentation on the basis of the provisional route employing tolls, the map information 121, and so on. Moreover, if the result of the decision in the step S13 was negative, then it is arranged for the control unit 110A to generate information for presentation related to the found routes on the basis of the first route and the second route for traveling without any limitation upon the usage of toll roads that were determined in the step S15, and on the basis of the map information 121 and so on.

Furthermore, if the result of the decision in the step S17 is affirmative, then the control unit 110A generates information for presentation on the basis of the cost avoidance provisional route, the map information 121, and so on. And, if the result of the decision in the step S17 is negative, then it is arranged for the control unit 110A to generate information for presentation related to the found routes on the basis of the first route and the second route for traveling while avoiding toll roads that were determined in the step S19, and on the basis of the map information 121 and so on. This information related to the found routes includes the expected traveling times required, the toll road costs, the charging up costs, and the estimated battery remaining amount upon arrival at the destination.

Subsequently, using the audio output unit 130 and the display unit 140, the control unit 110A presents to the user the information for presentation related to the retrieved routes that has been generated. When the information for presentation related to the found routes has been presented in this manner, the "searching processing for the first route and the second route, and the processing for presentation of the information for presentation" by the control unit 110A terminates.

Note that an example of information for presentation related to the found routes displayed upon the display device of the display unit 140 will be described hereinafter.
<<Toll Route Searching Processing>>

Next, the "toll route searching processing" in the step S15 described above will be explained.

Figure 5:
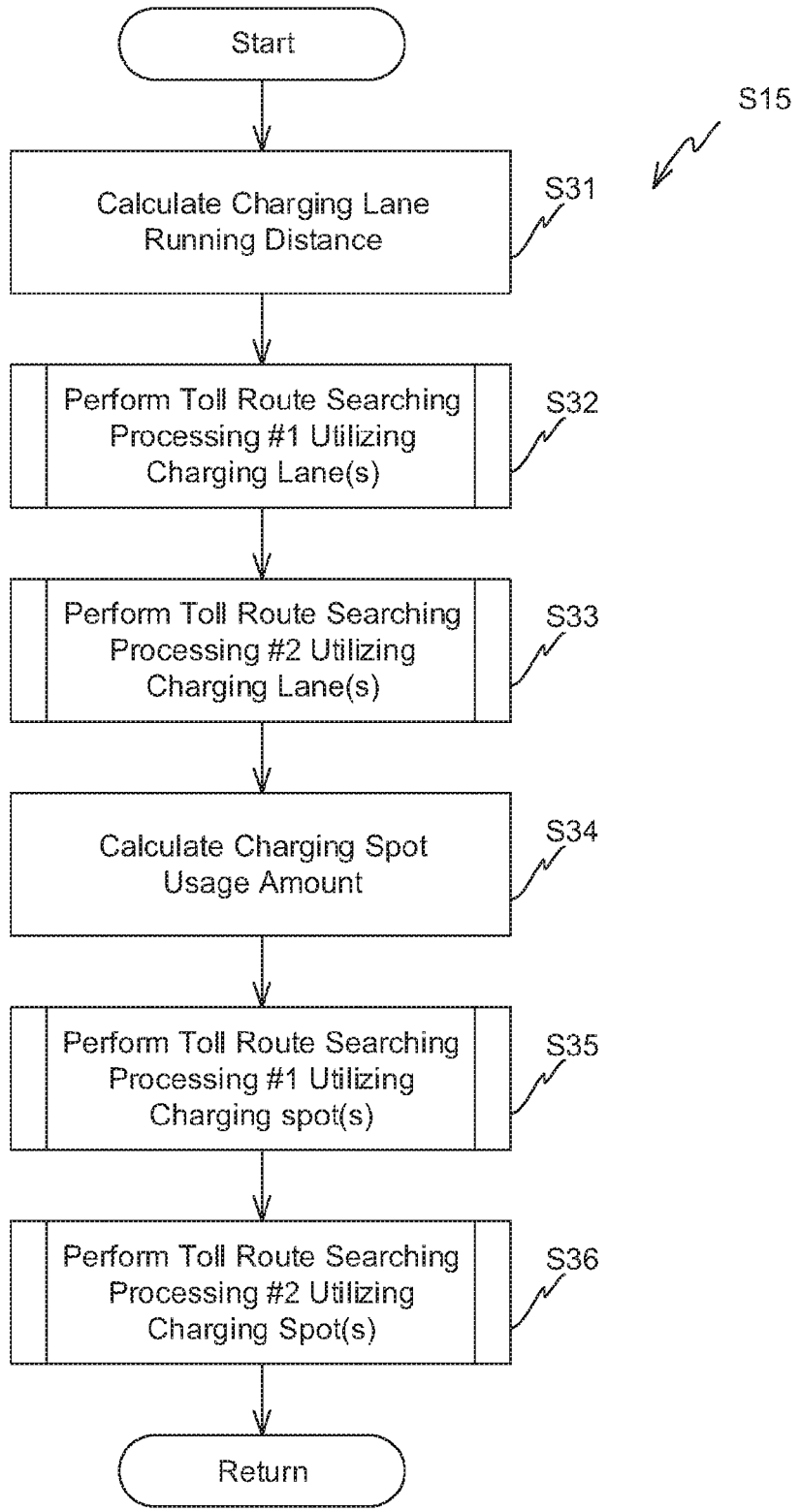
FIG. 5 is a flow chart for explanation of toll route searching processing in FIG. 4.

In the "toll route searching processing", first, in a step S31, as shown in FIG. 5, the control unit 110A calculates the "charging lane running distance". During this calculation of the "traveling lane running distance", the control unit 110A calculates the shortfall amount of the remaining power amount in the battery 210 with respect to the amount of electrical power that is needed in order for the vehicle CR to travel to the destination by traveling upon the provisional route employing tolls. And next the control unit 110A refers to the map information 121, and calculates the "charging lane running distance", which is the running distance that the vehicle CR is required to travel in one or more charging lanes in order to charge up the battery by this shortfall amount by running in the charging lane or lanes.

Subsequently, in a step S32, "toll route searching processing #1 utilizing charging lane(s)" is performed. And next, in a step S33, "toll route searching processing #2 utilizing charging lane(s)" is performed. The details of the processing in these steps S32 and S33 will be described hereinafter.

Subsequently, in a step S34, on the basis of the shortfall amount of the remaining power amount in the battery 210 with respect to the amount of electrical power that is needed in order for the vehicle CR to travel to the destination by traveling upon the provisional route employing tolls, the control unit 110A calculates the "charging spot usage amount", which is the amount of charge by which the battery must be charged up in one or more charging spots. Then, the flow of control proceeds to a step S35.

In the step S35, "toll route searching processing #1 utilizing charging spot(s)" is performed. And next, in a step S36, "toll route searching processing #2 utilizing charging spot(s)" is performed. The details of the processing in these steps S35 and S36 will be described hereinafter. And, when the processing of the step S36 has been completed, the processing of the step S15 terminates, and the flow of control is transferred to the step S16 of FIG. 4 described above.
(The Toll Route Searching Processing #1 Utilizing Charging Lane(s))

Next, the "toll route searching processing #1 utilizing charging lane(s)" in the step S32 described above will be explained.

Figure 6:
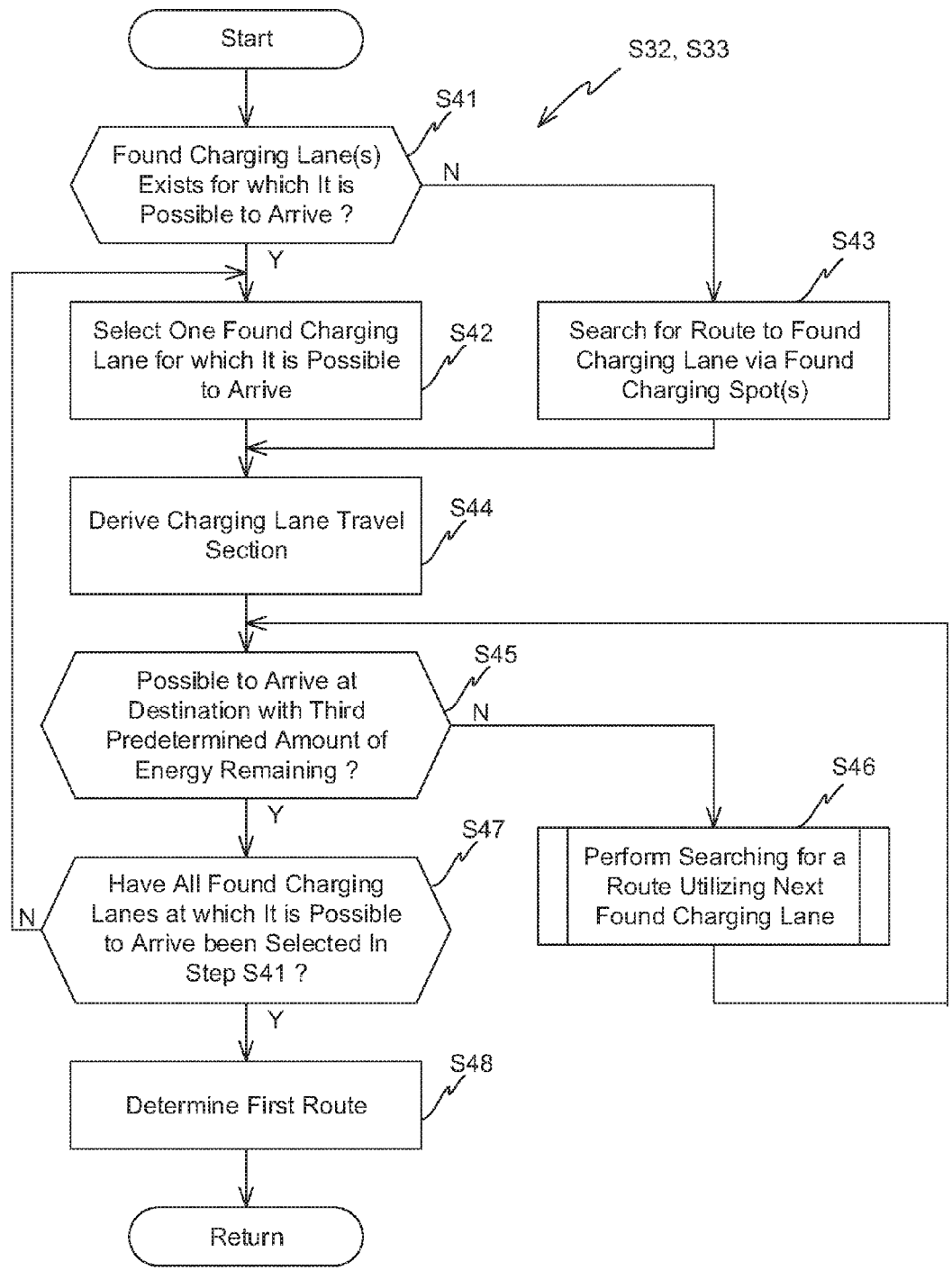
FIG. 6 is a flow chart for explanation of toll route searching processing in FIG. 5 utilizing charging lanes.

In the "toll route searching processing #1 utilizing charging lane(s)", as shown in FIG. 6, first, in a step S41, a decision is made as to whether or not any found charging lane or lanes exists to which, without performing charging in any found charging spot, it is possible to arrive from the current position with the second predetermined amount of energy remaining. If the result of the decision is affirmative (Y in the step S41), then the flow of control proceeds to a step S42. In the step S42, the control unit 110A selects one of the found charging lanes at which it is possible to arrive, and searches for a route to that found charging lane that has been selected. Subsequently, the flow of control is transferred to a step S44 that will be described hereinafter.

On the other hand, if the result of the decision in the step S41 is negative (N in the step S41), then the flow of control is transferred to a step S43. In the step S43, the found charging spot located between the current position and the found charging lane in the direction toward the destination that is the closest and moreover via which it is possible for the vehicle CR to reach the destination with the remaining amount at the present time point, are extracted as a charging spot for supply of power. And the control unit 110A formulates a charging plan in which, by using this charging spot for supply of power, battery charging is performed to the amount required for traveling to the closest found charging lane. Subsequently, the control unit 110A searches for a route to go to this closest found charging lane via the charging spot for supply of power. Then, the flow of control proceeds to the step S44.

In the step S44, the control unit 110A derives a charging lane travel section candidate on the basis of the charging lane running distance and the estimated remaining energy amount upon arrival at the found charging lane.

Subsequently, in a step S45, the control unit 110A calculates the estimated remaining amount of energy after having traveled via the charging lane travel section candidate, and, on the basis of that estimated amount, makes a decision as to whether or not it is possible to arrive at the destination with the third predetermined amount of energy remaining. Here, from the standpoint of saving charging up costs in charging up lanes in the "toll route searching processing #1 utilizing charging lanes", the "third predetermined amount" may be around 15% of full charge. If the result of the decision is negative (N in the step S45), then the flow of control proceeds to a step S46. In the step S46, "searching for a route utilizing the next found charging lane" is performed. And, when the processing of the step S46 ends, the flow of control returns to the step S45. The details of the processing in the step S46 will be described hereinafter.

On the other hand, if the result of the decision in the step S45 is affirmative (Y in the step S45), then the control unit 110A refers to the map information 121 and so on, and finds the route via the found charging lane that is selected for which the traveling time to the destination is the shortest. And then, the flow of control proceeds to a step S47. In the step S47, the control unit 110A makes a decision as to whether or not all of the found charging lanes have been selected via which, in step S41, it was found to be possible to arrive. If the result of the decision is negative (N in the step S47), then the flow of control returns to the step S42.

If the result of the decision in the step S47 is affirmative (Y in the step S47), then the flow of control proceeds to a step S48. In the step S48, from among the route plans to the destination that include plans for charging up the battery via the found charging lane which in the step S41 was determined as being one which it was possible to reach, the control unit 110A determines that route whose traveling time to the destination is the shortest, as being the first route (#1 thereof).

When the first route (#1 thereof) has been found in this manner, the processing of the step S32 terminates. And then, the flow of control proceeds to the step S33 of FIG. 5 as described above.

((Searching for a Route Utilizing the Next Found Charging Lane))

Next, the "searching for a route utilizing the next found charging lane" in the step S46 described above will be explained.

Figure 7:
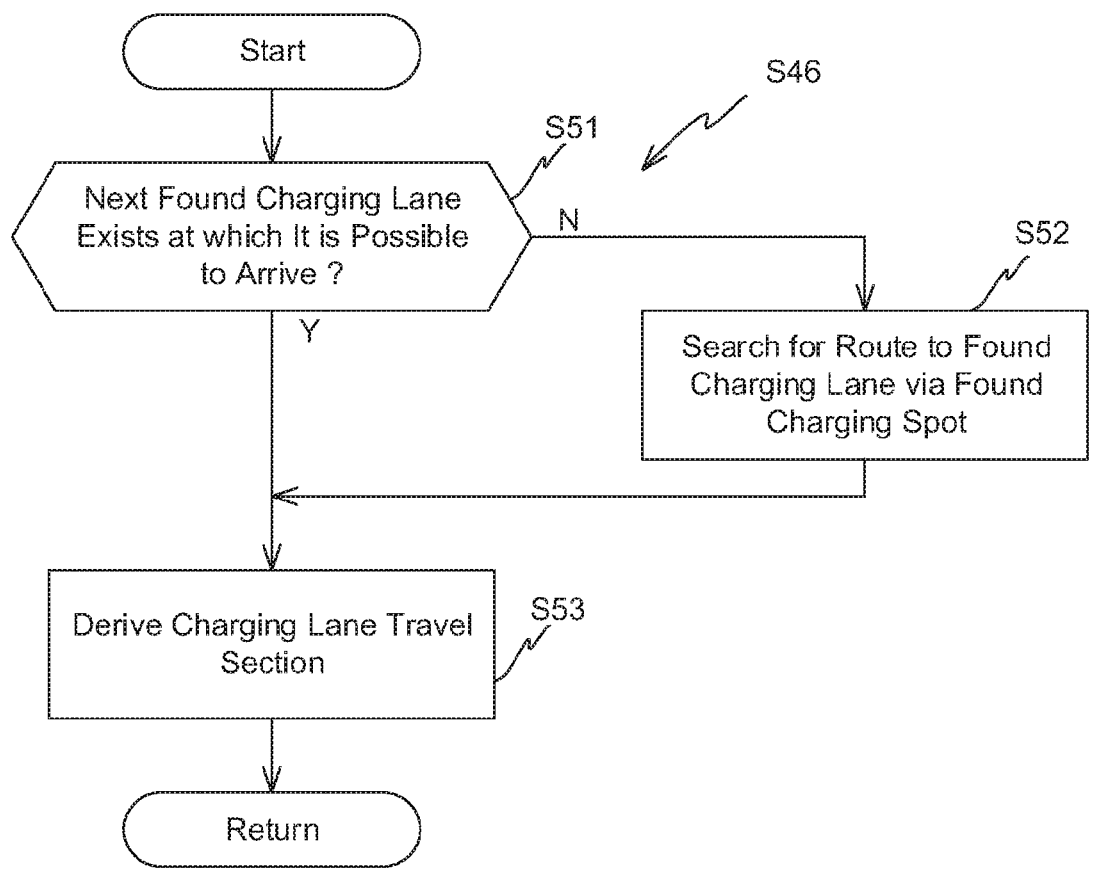
FIG. 7 is a flow chart for explanation of route searching in FIG. 6 using a next found charging lane.

In the "searching for a route utilizing the next found charging lane", as shown in FIG. 7, first, in a step S51, on the basis of the estimated remaining energy amounts that were calculated in the step S45, the control unit 110A makes a decision as to whether or not any found charging lane exists for which, without performing charging up at any found charging spot, it is possible to arrive while the second predetermined amount of energy remains, and that is present in the direction towards the destination from the end point of a found charging lane for which an estimated amount was calculated. If the result of the decision is affirmative (Y in the step S51), then control unit 110A searches for a route to that reachable found charging lane. Then, the flow of control is transferred to a step S53 that will be described hereinafter.

On the other hand, if the result of the decision in the step S51 is negative (N in the step S51), then the flow of control proceeds to a step S52. In the step S52, the control unit 110A extracts, as a charging spot for supply of power, a found charging spot that is present between the end point of the found charging lane for which said estimated amount has been calculated and the closest found charging lane in the direction towards the destination, and moreover for which it is possible for the vehicle CR to arrive with the estimated remaining energy amount. And the control unit 110A formulates a charging plan for performing charging up of the battery to the extent required for traveling to the closest found charging lane by passing via that charging spot for supply of power, and by using that charging spot for supply of power. Subsequently, the control unit 110A searches for a route to travel to the closest found charging lane via the charging point for supply of power. Then, the flow of control continues to a step S53.

In the step S53, the control unit 110A derives a charging lane travel section candidate on the basis of the shortfall running distance of the charging lane and also the estimated remaining energy amount upon arrival at the found charging lane that was determined in the step S51 or in the step S52. When a charging lane travel section candidate has been found in this manner, the processing of the step S46 terminates. And then, the flow of control returns to the step S45 of FIG. 6 described above.

(The Toll Route Searching Processing #2 Utilizing Charging Lane(s))

Next, the "toll route searching processing #2 utilizing charging lane(s)" in the step S33 described above will be explained.

In the "toll route searching processing #2 utilizing charging lane(s)", the first route (#2 thereof) is determined according to a sequence of processing that is similar to that of the step S32 described above (refer to FIGS. 6 and 7), except for the difference that the "third predetermined amount" is taken as being 75% of full charge, in order to ensure adequate energy in the battery 210 when arriving at the destination.

(Toll Route Searching Processing #1 Utilizing Charging Spot(s))

Next, the "toll route searching processing #1 utilizing charging spot(s)" in the step S35 described above will be explained.

Figure 8:
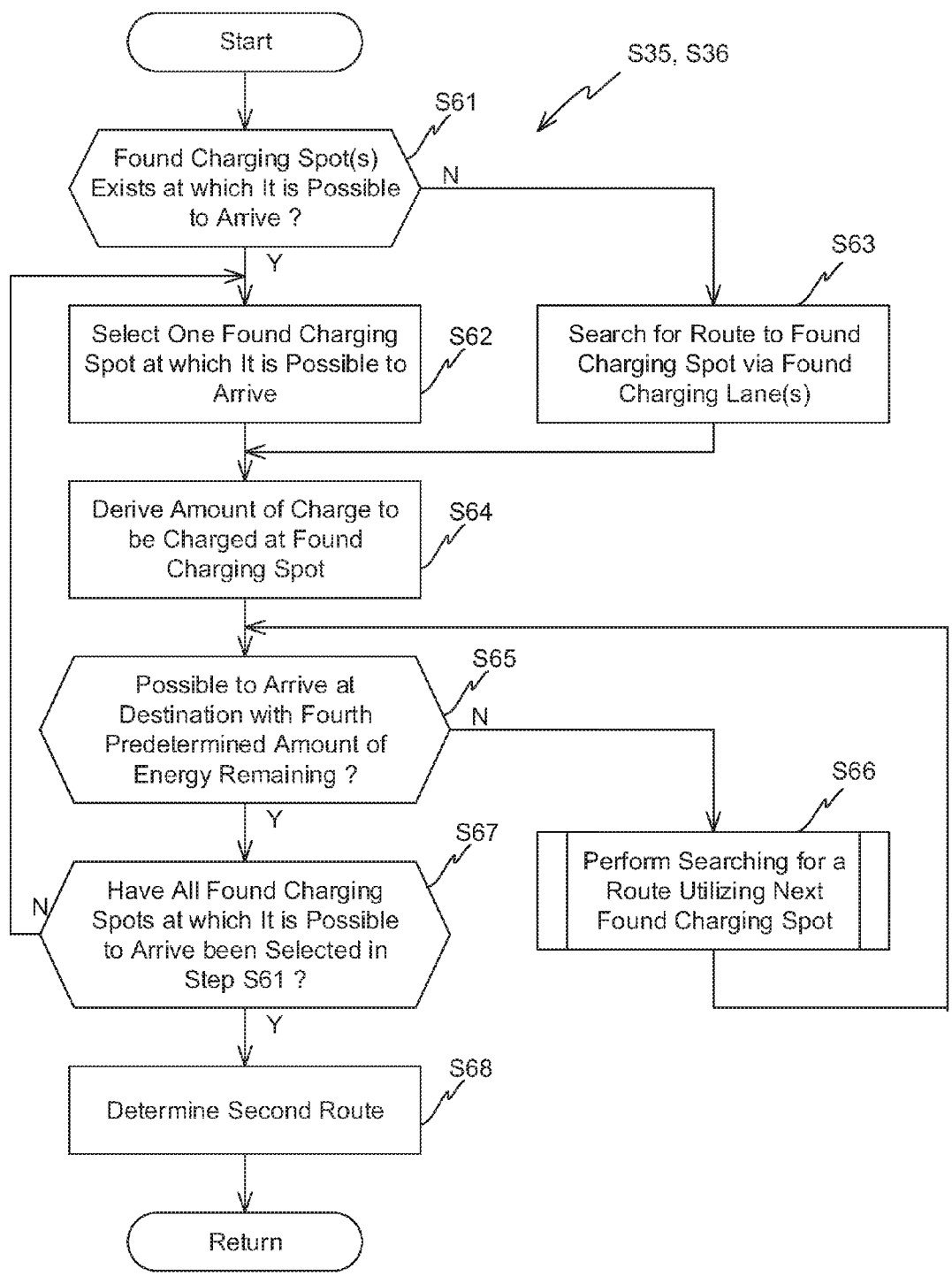
FIG. 8 is a flow chart for explanation of toll route searching processing in FIG. 5 utilizing charging spots.

In the "toll route searching processing #1 utilizing charging spot(s)", as shown in FIG. 8, first, in a step S61, a decision is made as to whether or not any found charging spot(s) exist at which, without performing charging in any found charging lane, it is possible to arrive from the current position with the second predetermined amount of energy remaining. If the result of the decision is affirmative (Y in the step S61), then the flow of control proceeds to a step S62. In the step S62, the control unit 110A selects one of the found charging spots at which it is possible to arrive, and searches for a route to that found charging spot that has been selected. Then, the flow of control is transferred to a step S64 that will be described hereinafter.

On the other hand, if the result of the decision in the step S61 is negative (N in the step S61), then the flow of control is transferred to a step S63. In the step S63, the found charging lane(s) located between the current position and the found charging spot that is closest in the direction toward the destination and moreover for which it is possible to arrive with the remaining energy amount at the present time point, are extracted as charging lane(s) for supply of power. And the control unit 110A formulates a charging plan which travels along that charging lane or lanes for supply of power, and with which battery charging is performed to the amount required for traveling to the closest found charging spot by traveling via those charging lane(s) for supply of power. Subsequently, the control unit 110A searches for a route to go to the closest found charging spot via those charging lane(s) for supply of power. Then, the flow of control proceeds to the step S64.

In the step S64, the control unit 110A derives an amount of electrical charge to be charged at the found charging spot on the basis of the charging spot usage amount and the estimated remaining energy amount upon arrival at the found charging spot.

Subsequently, in a step S65, the control unit 110A calculates the estimated remaining amount of energy after having charged up at the found charging spot, and, on the basis of that estimated amount, makes a decision as to whether or not it is possible to arrive at the destination with the fourth predetermined amount of energy remaining. Here, from the standpoint of saving charging up cost at the charging spot, the "fourth predetermined amount" may be around 15% of full charge. If the result of the decision is negative (N in the step S65), then the flow of control proceeds to a step S66. In the step S66, "searching for a route utilizing the next found charging spot" is performed. And, when the processing of the step S66 ends, the flow of control returns to the step S65. The details of the processing in the step S66 will be described hereinafter.

On the other hand, if the result of the decision in the step S65 is affirmative (Y in the step S65), then the control unit 110A refers to the map information 121 and so on, and searches for the route via the found charging spot that is selected for which the traveling time to the destination, including the time period for charging up at the found charging spot, is the shortest. And then, the flow of control proceeds to a step S67. In the step S67, the control unit 110A makes a decision as to whether or not all of the found charging spots have been selected at which, in step S61, it was found to be possible to arrive. If the result of the decision is negative (N in the step S67), then the flow of control returns to the step S62.

On the other hand, if the result of the decision in the step S67 is affirmative (Y in the step S67), then the flow of control proceeds to a step S68. In the step S68, from among the route plans to the destination that include a plan for performing charging up of the battery at the found charging spot which in the step S61 was determined as being one for which it was possible to arrive, the control unit 110A determines that route whose traveling time to the destination, including the time period for charging up at the charging spot, is the shortest, as being the second route (#1 thereof).

When the second route (#1 thereof) has been found in this manner, the processing of the step S35 terminates. And then, the flow of control proceeds to the step S36 of FIG. 5 as described above.

((Searching for a Route Utilizing the Next Found Charging Spot))

Next, the "searching for a route utilizing the next found charging spot" in the step S66 described above will be explained.

Figure 9:
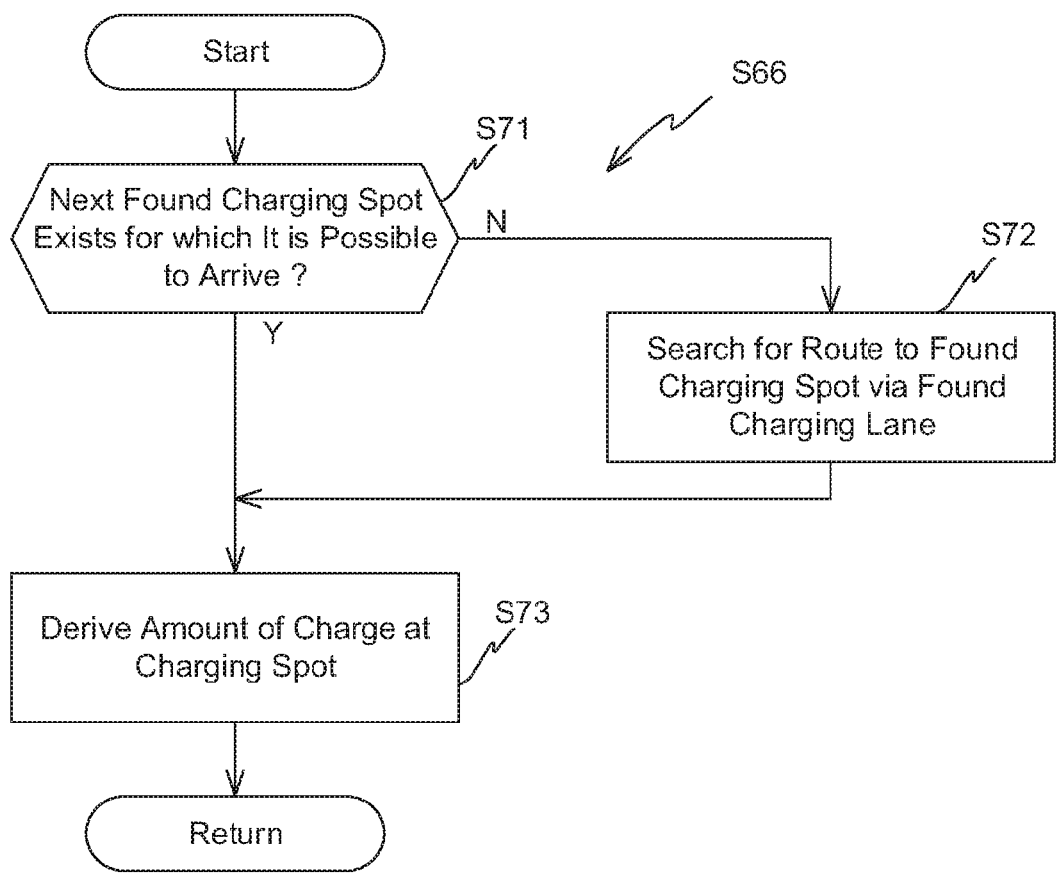
FIG. 9 is a flow chart for explanation of route searching in FIG. 6 using a next found charging spot.

In the "searching for a route utilizing the next found charging spot", as shown in FIG. 9, in a step S71, on the basis of the estimated remaining energy amount that was calculated in the step S65 described above, the control unit 110A makes a decision as to whether or not a found charging spot exists that is present in the direction toward the destination and at which it is possible to arrive from the found charging spot at which that estimated amount was calculated, with the second predetermined amount of energy remaining, and without charging up in a found charging lane. If the result of the decision is affirmative (Y in the step S71), then control unit 110A searches for a route to that reachable found charging spot. And then, the flow of control is transferred to a step S73 that will be described hereinafter.

But if the result of the decision in the step S71 is negative (N in the step S71), then the flow of control proceeds to a step S72. In the step S72, the control unit 110A extracts, as charging lane(s) for supply of power, one or more found charging lane(s) that are located between the found charging spot at which the above estimated amount is calculated and the found charging spot that is closest in the direction toward the destination, and moreover at which it is possible for the vehicle CR to arrive with the remaining energy amount. And the control unit 110A formulates a charging plan which travels along that charging lane or lanes for supply of power, and with which battery charging is performed to the amount required for traveling to the closest found charging spot by traveling via that charging lane for supply of power. Subsequently, the control unit 110A finds a route to go to the closest found charging spot via the charging lane for supply of power. Then, the flow of control proceeds to the step S73.

In the step S73, the control unit 110A derives an amount of charge to be charged at the found charging spot on the basis of the shortage amount of charge to be charged at the charging spot and the estimated remaining energy amount upon arrival at the found charging spot determined in the step S71 or in the step S72. When the amount of charge to be charged up at the found charging spot has been derived in this manner, the processing of the step S66 terminates. And then, the flow of control returns to the step S65 of FIG. 8 described above.

(Toll Route Searching Processing #2 Utilizing Charging Spot(s))

Next, the "toll route searching processing #2 utilizing charging spot(s)" in the step S36 described above will be explained.

In the "toll route searching processing #2 utilizing charging spot(s)", the second route (#2 thereof) is determined according to a sequence of processing that is similar to that of the step S36 described above (refer to FIGS. 8 and 9), except for the difference that the "fourth predetermined amount" is taken as being 75% of full charge, in order to ensure adequate energy in the battery 210 when arriving at the destination.

<<Cost Avoidance Route Searching Processing>>

Next, the "cost avoidance route searching processing" in the step S19 described above will be explained.

In the "cost avoidance route searching processing" as shown in FIG. 10, first, in a step S81, on the basis of the shortfall amount of the stored power in the battery 210 with respect to the amount of electrical power that is needed in order for the vehicle CR to travel to the destination while traveling along the cost avoidance provisional route, the control unit 110A calculates a "charging lane running distance", which is the running distance that the vehicle CR needs to travel in one or more charging lanes.

Subsequently, in a step S82, the control unit 110A performs searching for the first route (#3 thereof) in which priority is given to charging in charging lanes while avoiding toll roads, by performing a similar processing sequence to the processing in the step S32 described above (refer to FIGS. 6 and 7), except for the fact that, from the standpoint of keeping the charging up costs low, the "third predetermined amount" is set to be 30% of full charge, and for the fact that the route searching is performed while avoiding traveling upon toll roads. And next, in a step S84, the control unit 110A calculates a "charging spot usage amount", which is the amount of charge that must be charged up in one or more charging spots, on the basis of the shortfall amount of the remaining power in the battery 210 with respect to the amount of electrical power that is needed in order for the vehicle CR to travel to the destination while traveling along the cost avoidance provisional route. And then, the flow of control proceeds to a step S85.

In the step S85, the control unit 110A performs searching for a second route (#3 thereof) in which priority is given to charging in charging spots while avoiding toll roads, by performing a similar processing sequence to the processing in the step S35 described above (refer to FIGS. 8 and 9), except for the fact that, from the standpoint of keeping the charging up costs low, the "fourth predetermined amount" is set to be 30% of full charge, and for the fact that the route searching is performed while avoiding traveling upon toll roads. And, when the processing of the step S85 is completed, the processing of the step S19 terminates, and the flow of control proceeds to the step S20 of FIG. 4 described above.

The searching processing for the first route and the second route, and the processing for presentation of the information for presentation related to the first route and to the second route, are performed by executing the processing described above.

<<An Example of Display of Information for Processing Related to the First Route and the Second Route>>

Next, an example will be given of display upon the display unit 140 of information for presentation related to the first routes (#1 through #3 thereof) and the second routes (#1 through #3 thereof) generated in the step S20 described above.

An example is shown in FIG. 11 of a list of information for presentation related to the first routes and the second routes that take the departure position as "Kuki-shi" and the destination as "Sendai-shi". Here, the "route #1" is the first route (#1 thereof) that travels without imposing any limitation upon the usage of toll roads, that gives priority to charging in charging lanes, and that moreover holds down the charging up cost in charging lanes. The "route #1" is determined in the step S32 described above.

Furthermore, the "route #2" is the first route (#3 thereof) that avoids traveling upon toll roads, that gives priority to charging in charging lanes, and that holds down the charging up cost. The "route #2" is determined in the step S82 described above. Yet further, the "route #3" is the first route (#2 thereof) that travels without imposing any limitation upon the usage of toll roads, that gives priority to charging in charging lanes, and that moreover ensures a high amount of energy remaining in the battery 210 upon arrival at the destination. The "route #3" is determined in the step S33 described above.

Yet further, the "route #4" is the second route (#1 thereof) that travels without imposing any limitation upon the usage of toll roads, that gives priority to charging in charging spots, and that moreover holds down the charging up cost in charging spots. The "route #4" is determined in the step S35 described above.

And the "route #5" is the second route (#3 thereof) that travels while avoiding toll roads, that gives priority to charging in charging spots, and that moreover holds down the charging up cost. The "route #5" is determined in the step S85 described above. Even further, the "route #6" is the second route (#2 thereof) that travels without imposing any limitation upon the usage of toll roads, that gives priority to charging in charging spots, and that moreover ensures a high amount of energy remaining in the battery 210 upon arrival at the destination. The "route #6" is determined in the step S36 described above.

And the distance from the departure position to the destination, the expected traveling time required, the toll road costs, the charging up cost, and the battery remaining amount upon arrival at the destination, are displayed in FIG. 11 as list information related to these routes "route #1 through route #6".

Furthermore, in the first example, when the user selects one of the routes displayed in FIG. 11, detailed information is displayed accompanying the map display of the route that has thus been selected. Examples of the detailed information related to found routes of this type are shown in FIGS. 12 and 13.

Examples are shown in FIGS. 12(A) and 12(B) in which the "route #1" is displayed upon the map by thick lines. Here, in FIG. 12(A), "charging lane usage sections" based upon a charging plan are shown by thick white lines. Moreover, in FIG. 12(B), toll roads in route #1 are shown by thick black lines, and normal roads in route #1 are shown by thick white lines.

Figure 13:
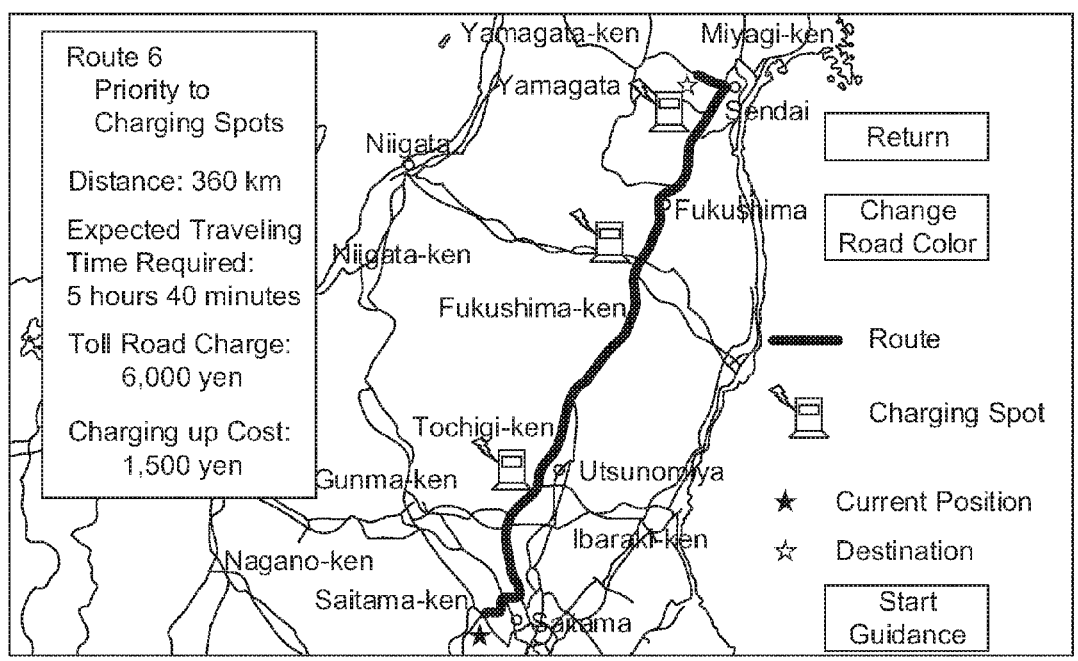
FIG. 13 shows an example of display, upon the display unit, of information for presentation related to the second route.

Furthermore, an example is shown in FIG. 13 in which "route #6" is displayed upon the map by a thick line. And, in FIG. 13, the positions of "charging spots" based upon a charging plan are shown by charging spot marks.

Note that, although no detailed information is shown for "route #2" and "route #3", it is arranged for it to be possible for them to be displayed in a similar manner to the displays of "route #1" in FIG. 12. Moreover, although no detailed information is shown for "route #4" and "route #5", it is arranged for it to be possible for them to be displayed in a similar manner to the display of "route #6" in FIG. 13.

As has been explained above, in the first example, the control unit 110A sequentially acquires the current position of the vehicle CR and the current value of the amount of energy remaining in the battery 210. And, when a route searching command in which a destination has been set is inputted to the input unit 150, the control unit 110A searches for the "provisional route employing tolls" for which the traveling time to the destination becomes shortest without imposing any limitation upon the usage of toll roads. Next, the control unit 110A makes a decision as to whether or not it is possible for the vehicle CR to arrive at the destination by traveling along the provisional route employing tolls without charging up the battery 210. If the result of the decision is negative, it finds "charging lanes" and "charging spots" that are present in the neighborhood of the provisional route employing tolls.

And next, on the basis of the current position, the current value of the remaining energy amount, the map information, and so on, the control unit 110A calculates the charging lane running distance, which is the distance that the vehicle must travel in one or more charging lanes. Moreover, the control unit 110A calculates the charging spot usage amount, which is the amount of charge that must be charged at charging spots. Subsequently, on the basis of the charging lane running distance, the information related to "charging lanes", the estimated remaining energy amount, and so on, the control unit 110A searches for the first route for traveling without imposing any limitation upon the usage of toll roads, which gives priority to charging in charging lanes, and which moreover takes into consideration the remaining energy amount upon arrival at the destination. Furthermore, on the basis of the charging spot usage amount, the information related to "charging spots", the estimated remaining energy amount, and so on, the control unit 110A searches for the second route for traveling without imposing any limitation upon the usage of toll roads, which gives priority to charging at charging spots, and which moreover takes into consideration the amount of remaining energy upon arrival at the destination.

Yet further, the control unit 110A searches for the "cost avoidance provisional route" to the destination for which the traveling time becomes shortest while avoiding travel upon toll roads, and then finds "charging lanes" and "charging spots" that are present in the neighborhood of this cost avoidance principal route. And, on the basis of the current position, the current value of the remaining energy amount, the map information, and so on, the control unit 110A calculates the charging lane running distance and the charging spot usage amount. Subsequently, on the basis of the charging lane running distance, the information related to "charging lanes", the estimated remaining energy amount, and so on, the control unit 110A searches for the first route for traveling while avoiding toll roads, which gives priority to charging in charging lanes, and which moreover takes into consideration the remaining energy amount upon arrival at the destination. Furthermore, on the basis of the charging spot usage amount, the information related to "charging spots", the estimated remaining energy amount, and so on, the control unit 110A searches for the second route for traveling while avoiding toll roads, which gives priority to charging at charging spots, and which moreover takes into consideration the amount of remaining energy upon arrival at the destination.

Subsequently, for each of the first routes and the second routes, the control unit 110A derives the expected traveling time required, the toll road cost, the charging up cost, and an estimated value of the amount of remaining energy upon arrival at the destination. And next, for each of the first routes and the second routes that travel without imposing any limitation upon the usage of toll roads, and for each of the first and second routes that travel while avoiding toll roads, the control unit 110A generates information for presentation related to the found route, which includes the distance to the destination, the expected traveling time required, the toll road cost, the charging up cost, the estimated value of the amount of remaining energy upon arrival at the destination, and so on. This information for presentation relating to the found routes that has been generated in this manner is presented to the user by employing the audio output unit 130 and the display unit 140, under control of the control unit 110A.

Due to this, before setting off for the destination, it is possible to search for first routes that give priority to charging in charging lanes and second routes that give priority to charging at charging spots, and to present to the user information for presentation that includes the distances to the destination, the expected traveling time required, the toll road cost, the charging up cost, the estimated remaining energy amount upon arrival at the destination, and so on, related to each of these first routes and to each of these second routes, Here, in the first example, for each of the first route and the second route, and for traveling without any limitation upon the usage of toll roads, it is arranged to find one route for which the remaining energy amount upon arrival at the destination will be around 15% of full charge, and one route for which the remaining energy amount upon arrival at the destination will be around 75% of full charge. For example, if the destination is the home of the user and he desires to keep down the charging up cost on the way, then it may be supposed that the route for which the remaining energy amount in the battery upon arrival at the destination will be around 15% of full charge will be selected. And if, for example, no charging facility exists in the neighborhood of the destination; then, since it is desirable for the vehicle to arrive at the destination with as much energy remaining in the battery as possible, accordingly it may be supposed that the route for which the remaining energy amount in the battery upon arrival at the destination will be around 75% of full charge will be selected.

Moreover, in the first example, for each of the first route and the second route, it is arranged also to find a route for traveling while avoiding toll roads. For example, there is a possibility that this type of route may be selected by the user, if he desires to keep down the driving cost and is not in a hurry to arrive at his destination. In this manner, with the first example, it becomes possible for the user to select the route that is most appropriate to his own particular requirements.

Furthermore, in the first example, during the route searching that is implemented before setting off for the destination, the need for utilizing a charging facility is determined on the basis of the remaining amount of energy in the battery 210. And, if it has been determined that it will be necessary to charge the battery at some charging facility, then it is arranged to perform searching for a route that includes a charging plan. Due to this, the possibility is reduced that, during travel to the destination, it will become necessary to search a second time for a route that includes a charging plan, so that it also becomes unlikely that the time point of arrival at the destination will be greatly delayed. Moreover, with the first example, it becomes possible to ensure than no stress upon the user is engendered, since the time period over which the battery will need to be charged and any travel detour are presupposed at the time point of finding the route, i.e. before setting off for the destination.

Yet further, in the first example, the travel section(s) of the charging lane(s) are determined by estimating the remaining energy amount upon arrival at the destination. Due to this, it is possible to suppress increase in the charging up cost due to continuous traveling in a charging lane.

Accordingly, in the first example, it is possible to enhance the convenience for the user by performing route searching that includes a charging plan in which both charging lanes and also charging spots are effectively utilized.

[The Second Example]

Next, the second example of the present invention will be explained, with principal reference being made to FIGS. 14 through 16. The second example is one aspect of the second embodiment described above (refer to FIG. 2).

<Configuration>

Figure 14:
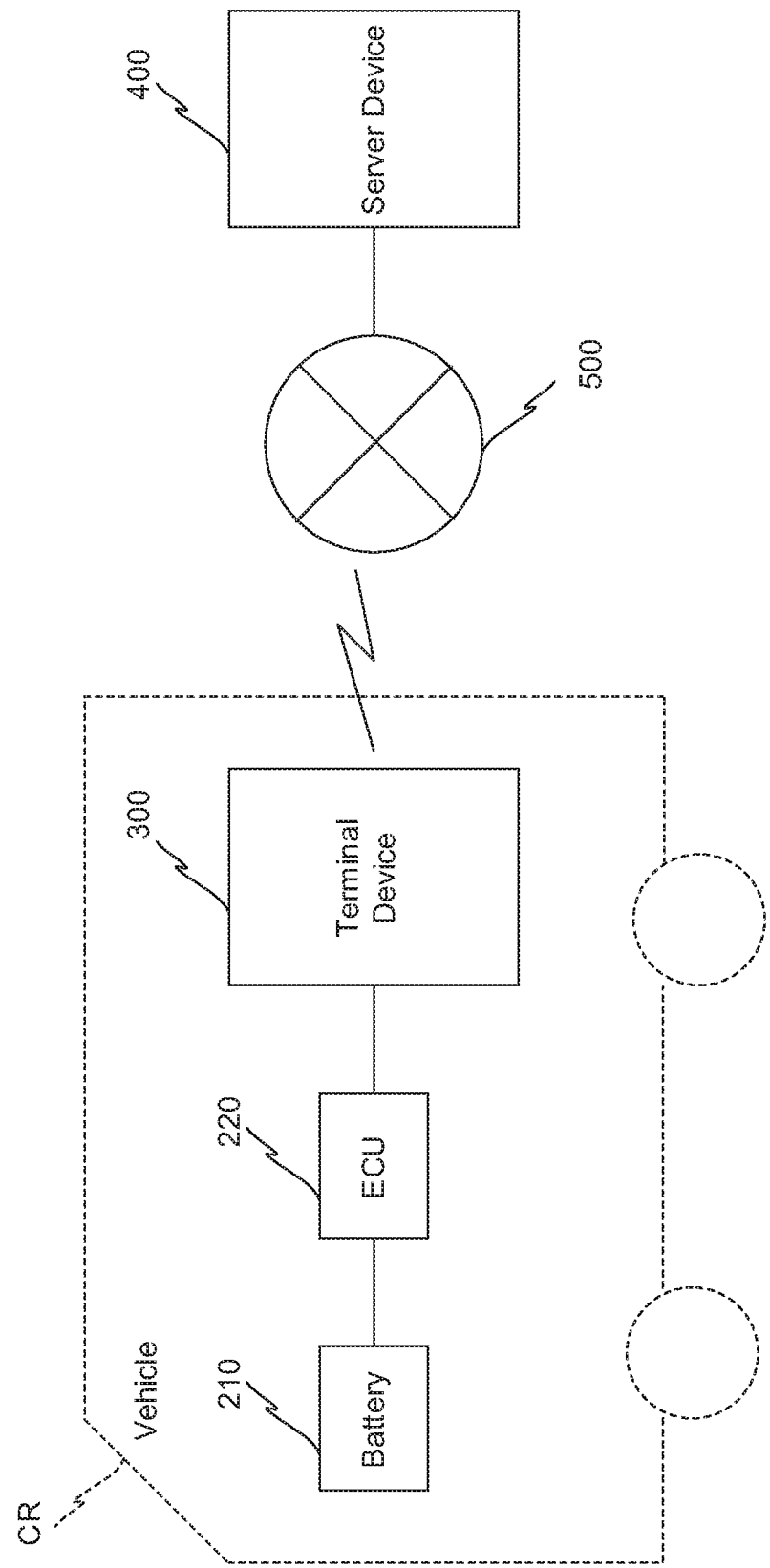
FIG. 14 is a block diagram for explanation of the positioning of a terminal device and a server device according to the second example of the present invention.

The configuration relationship between a terminal device 300 and a server device 400 according to the second example is shown in FIG. 14. Note that the terminal device 300 is one aspect of the terminal device 810 according to the second embodiment described above, and the server device 400 is one aspect of the route searching device 820 according to the second embodiment described above.

As shown in FIG. 14, the terminal device 300 is adapted to be disposed in a vehicle CR. In a similar manner to the case in the first example described above, the vehicle CR is equipped with a battery 210 and with an ECU 220.

The server device 400 is disposed exterior to the vehicle CR. And the terminal device 300 and the server device 400 are capable of communicating with each other via a network 500.

Note that, while actually the server device 400 is adapted to be capable of also communicating with other terminal devices that have similar structures to that of the terminal device 300, only the terminal device 300 is shown in FIG. 14 as a representative.

<<Configuration of the Terminal Device 300>>

Figure 15:
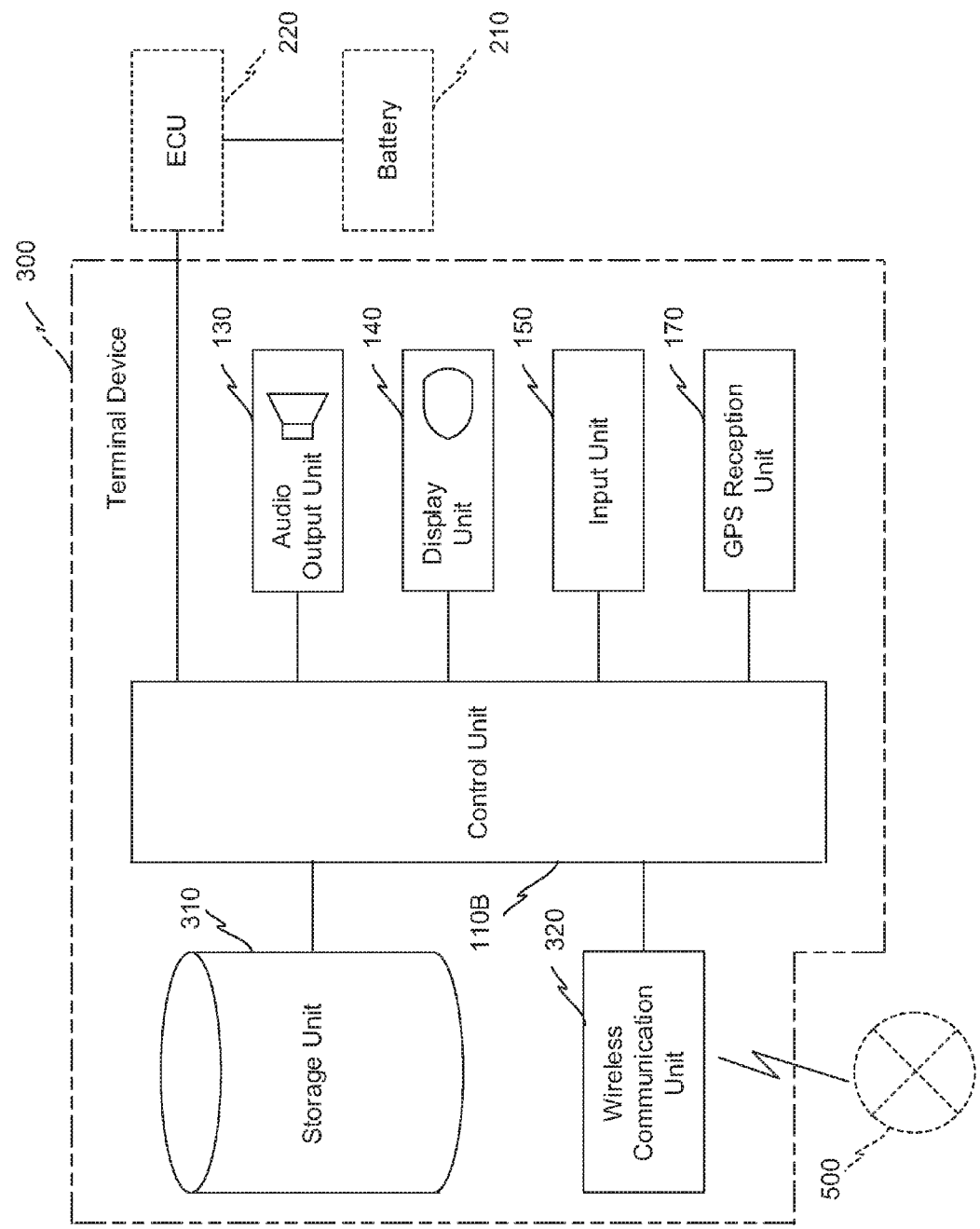
FIG. 15 is a block diagram schematically showing the configuration of the terminal device of FIG. 14.

A schematic block diagram showing the configuration of the terminal device 300 is shown in FIG. 15. As shown in FIG. 15, as compared with the route searching device 100 of the first example described above, the terminal device 300 differs by the feature that it comprises a control unit 110B instead of the control unit 110A, by the feature that it comprises a storage unit 310 instead of the storage unit 120A, and by the feature that it comprises a wireless communication unit 320. Here, the wireless communication unit 320 fulfills the functions of the transmission unit 811 and the reception unit 812 described above. The following explanation will principally concentrate upon these points of difference.

The control unit 110B described above comprises a central processing device (CPU) and circuitry associated therewith, and controls the entire terminal device 300 as a whole. Functions of the terminal device 300 of various types are implemented by the control unit 110B executing programs of various kinds. The function of the acquisition unit 740B of the second embodiment described above is included among these functions.

The control unit 110B acquires GPS data received from the GPS reception unit 170, and specifies the current position and the present time instant on the basis of this GPS data that has thus been acquired. And, by employing the wireless communication unit 320, the control unit 110B transmits the current position that has thus been specified to the server device 400 via the network 500 as transmitted terminal data.

Moreover, the control unit 110B acquires the current value of the remaining amount of energy sent from the ECU 220. And, by employing the wireless communication unit 320, the control unit 110B transmits this current value of the remaining amount of energy that has thus been acquired to the server device 400 via the network 500 as transmitted terminal data.

Furthermore, the control unit 110B receives input data sent from the input unit 150. And, if a route searching command in which a destination is specified is included in this input data, then the control unit 110B transmits the route searching command to the server device 400 via the network 500 as transmitted terminal data by employing the wireless communication unit 320.

Yet further, the control unit 110B receives information for presentation related to the first route and to the second route that has been transmitted from the server device 400 and received by the wireless communication unit 320 via the network 500. And, in order to present the information for presentation related to the first route and to the second route that has thus been received and the like, the control unit 110B executes control for performing guidance display by employing the display unit 140 and for performing audio guidance by employing the audio output unit 130

The program that is executed by this control unit 110B is recorded upon a computer readable recording medium such as a hard disk, a CD-ROM, a DVD, or the like, and is loaded from that recording medium and executed. Moreover, this program may be acquired in a format recorded upon a transportable recording medium such as a CD ROM, a DVD or the like; or it could also be acquired in a format distributed via a network such as the internet or the like.

Note that the details of the processing performed by the control unit 110B will be described hereinafter.

The storage unit 310 mentioned above comprises a non-volatile storage device such as a hard disk or the like, and stores information and data of various types utilized by the terminal device 300. The control unit 110B is adapted to be capable of accessing the storage unit 310.

The wireless communication unit 320 mentioned above receives transmitted terminal data that is sent from the control unit 110B. And the wireless communication unit 320 transmits this transmitted terminal data to the server device 400 via the network 500.

Moreover, the wireless communication unit 320 receives transmitted server data that is transmitted from the server device 400 via the network 500. And the wireless communication unit 320 sends the transmitted server data to the control unit 110B. Here, the wireless communication unit 320 is adapted to fulfill the functions of the transmission unit 811 and the reception unit 812 described above.

<<Configuration of the Terminal Device 400>>

A schematic block diagram showing the configuration of the server 400 is shown in FIG. 16. As shown in FIG. 16, the server device 400 comprises a control unit 110C, a storage unit 120C, and an external communication unit 410.

The control unit 110C described above comprises a central processing device (CPU) and peripheral circuitry thereof, and controls the server device 400 as a whole. It is arranged for various functions of the server device 400 to be provided by this control unit 110C executing programs of various kinds. The functions of the acquisition unit 740C, the searching unit 750, the finding unit 760, the calculation unit 770, and the generation unit 780 of the second embodiment described above are included among these functions.

The program that is executed by the control unit 110C is recorded upon a computer readable recording medium such as a hard disk, a CD-ROM, a DVD, or the like, and is loaded from that recording medium and executed. Moreover, it would also be acceptable to arrange for the program to be acquired in the format of being recorded upon a transportable recording medium such as a CD-ROM, a DVD, or the like, or for it to be acquired in the format of being distributed via a network such as the internet or the like.

Note that the details of the processing performed by the control unit 110C will be described hereinafter.

The storage unit 120C described above comprises a non-volatile storage device such as a hard disk device or the like, and stores information and data of various kinds that is utilized by the server device 400. The map information 121 and so on described above is included in this information and data. The control unit 110C is adapted to be able to access the storage unit 120C. Here, it is arranged for the storage unit 120C to fulfill the function of the recording unit 730 described above.

The external communication unit 410 described above receives transmitted terminal data transmitted from the terminal device 300 via the network 500. And the external communication unit 410 sends this transmitted terminal data to the control unit 110C.

Moreover, the external communication unit 410 receives transmitted server data from the control unit 110C. And the external communication unit 410 sends this transmitted server data to the terminal device 300 via the network 500. Here, the external communication unit 410 is adapted to fulfill the functions of the reception unit 821 and the transmission unit 822 described above.

With the configuration of the terminal device 300 and the configuration of the server device 400 described above, the transmitted terminal data that is outputted from the control unit 110B is sent to the control unit 110C via the wireless communication unit 320, the network 500, and the external communication unit 410. Moreover, the transmitted server data that is outputted from the control unit 110C is sent to the control unit 110B via the external communication unit 410, the network 500, and the wireless communication unit 320.

<Operation>

The following explanation will principally concentrate upon the searching processing for the first route and the second route, and upon the processing for presentation of the information for presentation related to the first route and to the second route that is executed in mutual cooperation by the terminal device 300 and the server device 400 which have the configuration described above.

Note that it will be supposed that the current value of the remaining energy amount is sequentially sent from the ECU 220 to the control unit 110B of the terminal device 300. Moreover, it will be supposed that information related to the current position and to the present time instant is sequentially sent from the GPS reception unit 170 to the control unit 110B as GPS data.

And it will be supposed that, each time the current value of the remaining energy amount is received from the ECU 220 by the control unit 110B, the current value of the remaining energy amount is transmitted by the terminal device to the control unit 110C of the server device 400. Moreover it will be supposed that, each time the GPS data is sent from the GPS reception unit 170, the control unit 110B transmits this GPS data to the control unit 110C.

Furthermore, when the control unit 110B receives from the input unit 150 a route searching command in which a destination has been set as input data, it is arranged for this route searching command to be transmitted by the terminal device 300 to the control unit 110C.

The searching processing for the first routes and the second routes is executed on the basis of the above operational environment. In the route searching processing, when a route searching command is received from the terminal device 300, the control unit 110C executes processing similar to the processing of the steps S12 through S20 (refer to FIGS. 4 through 10) executed by the control unit 110A of the first embodiment described above, thereby searching for the first route and the second route, and then generates information for presentation related to the first route and the second route. And the control unit 110C transmits the information for presentation related to the first route and second route to the terminal device 300.

Upon receipt by the terminal device 300 of the information for presentation related to the first route and the second route, the control unit 110B presents this information for presentation related to the first route and the second route to the user by employing the audio output unit 130 and the display unit 140 (refer to FIGS. 11 through 13).

As has been explained above, in the second example, the control unit 110B of the terminal device 300 sequentially acquires the current position of the vehicle CR and the current value of the remaining amount of energy in the battery 210, and transmits them to the server device 400. And, when input of a route searching command in which a destination has been set is performed to the input unit 150 of the terminal device 300, the control unit 110B transmits that route searching command to the server device 400.

In the server device 400, the control unit 110C searches for the "provisional route employing tolls" to the destination for which the traveling time becomes shortest while traveling without any limitation upon the usage of toll roads. Next, the control unit 110C decides whether or not it is possible for the vehicle CR to arrive at the destination by traveling upon this provisional route employing tolls without charging up the battery 210, and, if the result of the decision is negative, finds "charging lanes" and "charging spots" that are located around the provisional route employing tolls.

Next, the control unit 110C calculates a charging lane running distance and a charging spot usage amount on the basis of the current position, the current value of the remaining energy amount, the map information, and so on. Subsequently, on the basis of the charging lane running distance, the information related to "charging lanes", the estimated remaining energy amount and so on, the control unit 110C searches for the first route that gives priority to traveling while charging up in charging lanes, and that moreover travels without any limitation upon the usage of toll roads while taking into consideration the remaining amount of energy upon arrival at the destination. Moreover, on the basis of the charging spot usage amount, the information related to "charging spots", the estimated remaining energy amount and so on, the control unit 110C searched for the second route that gives priority to traveling while charging up at charging spots, and that moreover travels without any limitation upon the usage of toll roads while taking into consideration the remaining amount of energy upon arrival at the destination.

Furthermore, the control unit 110C searched for a "cost avoidance provisional route" for which the traveling time to the destination becomes the shortest by traveling while avoiding toll roads, and finds "charging lanes" and "charging spots" that are located in the neighborhood of this cost avoidance provisional route. And the control unit 110C calculates the charging lane running distance and the charging spot usage amount on the basis of the current position, the current value of the remaining amount of energy, the map information, and so on. Subsequently, on the bas0069s of the charging lane running distance, the information related to "charging lanes", the estimated remaining energy amount, and so on, the control unit 110C searches the first route that gives priority to charging in charging lanes, and that moreover travels while avoiding toll roads and while taking into consideration the remaining amount of energy upon arrival at the destination. Moreover, on the basis of the charging spot usage amount, the information related to "charging spots", the estimated remaining energy amount, and so on, the control unit 110C searches the second route that gives priority to charging at charging spots, and that moreover travels while avoiding toll roads and while taking into consideration the remaining amount of energy upon arrival at the destination.

Next for the routes that have been found, including, for each of the first route and the second route for traveling without any limitation upon the usage of toll roads and for each of the first route and the second route for traveling while avoiding toll roads, the control unit 110C generates information for presentation related to these routes that have been found, including their distances to the destination, their expected traveling times required, their toll road costs, their charging up costs, and the estimated values of their remaining amounts of energy upon arrival at the destination. And the control unit 110C transmits this information for presentation related to the found routes that has thus been generated to the terminal device 300. When the information for presentation related to the found routes has been transmitted to the terminal device 300 in this manner, under control by the control unit 110B, the information for presentation related to the found routes is presented to the user by employing the audio output unit 130 and the display unit 140.

Due to this, before setting off for the destination, it is possible to searches for the first route that gives priority to charging in charging lanes and the second route that gives priority to charging at charging spots, and present to the user information for presentation that includes the distances to the destination, the expected traveling times required, the toll road costs, the charging up costs, the estimated remaining energy amounts upon arrival at the destination, and so on, related to each of that first route and that second route. As a result, in a similar manner to the case with the first example described above, it becomes possible for the user to select the route which he himself desires to follow.

Furthermore, in the second example, in a similar manner to the case with the first example described above, in the route searching that is performed before setting off to the destination, the necessity for utilizing some charging facility is determined upon on the basis of the remaining amount of energy in the battery 210. And, if it has been decided that it is necessary to perform charging at some charging facility, then it is arranged to perform searching for a route that includes a charging plan. Due to this, the possibility is reduced that, during travel to the destination, it will become necessary to search a second time for a route that includes a charging plan, so that it also becomes unlikely that the time point of arrival at the destination will be greatly delayed. Moreover, with the second example, it becomes possible to ensure than no stress upon the user is engendered, because the time period over which the battery will need to be charged and any travel detour are presupposed at the time point of finding the route, i.e. before setting off for the destination.

Furthermore, in the second example, the remaining amount of energy when arriving at the destination is estimated, and the section(s) for traveling in charging lane(s) are determined in advance. Due to this, it is possible to prevent increase in the cost for charging due to continuous traveling in a charging lane.

Accordingly, in the second example, in a similar manner to the case with the first example, it is possible to enhance the convenience for the user by performing route searching that includes a charging plan in which both charging lanes and also charging spots are effectively utilized.

[Modification of the Examples]

The present invention is not to be considered as being limited to the examples described above; modifications of various kinds are possible.

For example while, in the first and second examples described above, it is arranged to search for the first route and the second route to the destination in consideration of whether their traveling times are long or short. However, it would also be acceptable to arrange to search for the first route and the second route to the destination in consideration of whether their running distances are long or short.

And while, in the first and second examples described above, the estimated remaining energy amount upon arrival at the destination was displayed as a percentage of full charge (refer to FIG. 11), it would also be acceptable to arrange to provide a different display mode, such as kWh (kilowatt-hours) or the like.

Moreover while, in the first and second examples described above, it was arranged to display the distances to the destination as information for presentation relating to the found routes. However, it would also be acceptable to arrange to write, at the sides of those distances, the charging lane running distances needed for supplying the amounts of electrical power that are required in order to travel to the destination. Furthermore, while it was arranged to display the expected traveling times required as information for presentation relating to the found routes, it would also be acceptable to arrange to write, at the sides of those times, the charging times at the charging spots needed for supplying the amounts of electrical power that are required in order to travel to the destination.

Furthermore, in the first and second examples described above, it was arranged for the current value of the remaining energy amount in the battery to be reported from the external ECU 220 to the route searching device and to the terminal device. By contrast, if it is impossible to receive the current value of the remaining energy amount from the exterior, then it would also be acceptable to arrange to provide the route searching device and/or the terminal device with a sensor for detecting the current value of the remaining energy amount.

Yet further, in the first and second examples described above, it was arranged for the information related to charging facilities such as section information for "charging lanes" and position information for "charging spots" to be recorded in the map information in the storage unit. By contrast, it would also be acceptable to arrange to acquire the information related to such charging facilities from an external system server.

In this type of case, if there is some charging lane or charging spot that cannot be utilized due to the state of traffic such as congestion or the like, or due to weather conditions such as falling snow or the like, then they may be excluded from the subjects of utilization. As a result, the possibility arises of being able to avoid cutoff of the energy in the battery due to not utilize some charging facility at which it is planned to charge up the battery, or searching for a route a second time, or a great delay in the time of arrival at the destination or the like.

Furthermore, it would also be acceptable for the route searching device of the first example described above and the terminal device of the second example having a screen display function, such as a smart phone or the like. Also, it would be acceptable for the server device of the second example described above to be a personal computer that is set up in a household.

Even further, while in the first and second examples described above the present invention is applied to a device that was disposed within an electric automobile, it would of course also be possible to apply the present invention to a device that is disposed in a vehicle that utilizes electrical energy for only a portion of its propulsion energy (for example, in a hybrid vehicle).

Moreover, it would also be possible to implement similar variations to those described above for the first and second embodiments, to the first and second examples described above as well.

The invention claimed is:

1. A route searching device that searches for a route to a destination, comprising:
   an input unit through which a user selects a route priority for a vehicle;
   a presentation unit that presents information for a route to the destination; and
   one or more processors configured to:
   find both of a charging lane that charges a battery of the vehicle while the vehicle travels on the charging lane, and a charging spot that charges the battery of the vehicle while the vehicle is stopped on the charging spot;
   determine information (a) and (b) when the user selects on the input unit a priority for a first route in which use of the charging lane has a higher priority than use of the charging spot, where information (a) and (b) are
      (a) information for a route to the destination using the charging lane when the vehicle can reach the charging lane without charging the battery at the charging spot, and (b) information for a route to the destination using both the charging spot that the vehicle can reach when the vehicle cannot reach the charging lane without charging the battery at the charging spot and the charging lane closest to the charging spot; and present on said presentation unit an applicable one of information (a) and (b).

2. The route searching device according to claim 1, wherein said one or more processors is further configured to search for the first route and a second route that gives priority to charging the battery of the vehicle on the charging spot, and wherein the route searching device further comprises a generation unit generating information for presentation on the presentation unit that further includes information for presentation related to the first route and information for presentation related to the second route.

3. The route searching device according to claim 2, wherein said one or more processors is further configured to calculate a charging cost for each of said first route and said second route;

wherein said generation unit further generates information for presentation related to the charging cost for both said first route and said second route calculated by said one or more processors.

4. The route searching device according to claim 2, wherein said one or more processors is further configured to calculate, for both said first route and said second route, at least one of an expected time point of arrival at said destination, and an expected traveling time required for traveling to said destination;

wherein said generation unit further is configured to generate information for presentation related to at least one of information for presentation related to at least one of the expected time point of arrival at said destination and the expected traveling time required for traveling to said destination via said first route, and information for presentation related to at least one of the expected time point of arrival at said destination and the expected traveling time required for traveling to said destination via said second route.

5. A route searching method that is employed by a route searching device that searches for a route to a destination, the method comprising the steps of:

selecting a route priority for a vehicle;

presenting on a presentation unit information for a route to the destination;

one or more processors finding both of a charging lane on which a battery of the vehicle is charged while the vehicle travels on charging lane, and a charging spot at which the battery of the vehicle is charged when the vehicle is stopped on the charging spot;

said one or more processors also determining information (a) and (b) when the selecting step selects a priority for a first route in which use of the charging lane has a higher priority than use of the charging spot, wherein information (a) and (b) are (a) information for a route to the destination using the charging lane when the vehicle can reach the charging lane without charging the battery at the charging spot, and (b) information for a route to the destination using both the charging spot that the vehicle can reach when the vehicle cannot reach the charging lane without charging the battery at the charging spot and the charging lane closest to the charging spot; and presenting on the presentation unit an applicable one of information (a) and (b).

6. A non-transient computer readable medium having recorded thereon a route searching program that, when executed, causes a computer in a route searching device that searches for a route to a destination to execute the route searching method according to claim 5.

7. A route searching device that searches for a route to a destination, comprising:

a reception unit that receives route priority information from a terminal device;

a transmission unit that transmits to the terminal device information for a route to the destination; and one or more processors configured to:

find both of a charging lane that charges a battery of the vehicle while the vehicle travels on the charging lane, and a charging spot that charges the battery of the vehicle while the vehicle is stopped on the charging spot;

determine information (a) and (b) when the reception unit receives from the terminal device a priority for a first route in which use of the charging lane has a higher priority than use of the charging spot, wherein information (a) and (b) are (a) information for a route to the destination using the charging lane when the vehicle can reach the charging lane without charging the battery at the charging spot, and (b) information for a route to the destination using both the charging spot that the vehicle can reach when the vehicle cannot reach the charging lane without charging the battery at the charging spot and the charging lane closest to the charging spot; and send to said transmission unit, for transmission to the terminal device, an applicable one of information (a) and (b).

8. The route searching device according to claim 7, wherein the terminal device comprises:

a receiver receiving one of information (a) and (b) for presentation; and a display presenting said one of information (a) and (b) for presentation from said receiver.

* * * * *